United States Patent
Kim et al.

(10) Patent No.: US 10,829,591 B2
(45) Date of Patent: *Nov. 10, 2020

(54) LATEX PRODUCTS HAVING POLYMERS AND POLYMER ADDUCTS AS QUICK-SETTING ADDITIVES

(71) Applicant: Arkema Inc., King of Prussia, PA (US)

(72) Inventors: Kyu-Jun Kim, Cary, NC (US); Rong Hu, Apex, NC (US); Michael C. Kaufman, Apex, NC (US)

(73) Assignee: Arkema Inc., King of Prussia, PA (US)

( * ) Notice: Subject to any disclaimer, the term of this patent is extended or adjusted under 35 U.S.C. 154(b) by 226 days.

This patent is subject to a terminal disclaimer.

(21) Appl. No.: 15/737,388

(22) PCT Filed: Jun. 16, 2016

(86) PCT No.: PCT/US2016/037750
§ 371 (c)(1),
(2) Date: Dec. 18, 2017

(87) PCT Pub. No.: WO2016/209691
PCT Pub. Date: Dec. 29, 2016

(65) Prior Publication Data
US 2018/0162997 A1    Jun. 14, 2018

Related U.S. Application Data

(60) Provisional application No. 62/183,324, filed on Jun. 23, 2015, provisional application No. 62/319,465, filed on Apr. 7, 2016.

(51) Int. Cl.
*C08L 79/02*    (2006.01)
*C08G 73/02*    (2006.01)
(Continued)

(52) U.S. Cl.
CPC .......... *C08G 73/024* (2013.01); *C08L 25/08* (2013.01); *C08L 57/06* (2013.01); *C08L 79/02* (2013.01);
(Continued)

(58) Field of Classification Search
None
See application file for complete search history.

(56) References Cited

U.S. PATENT DOCUMENTS

| 4,199,400 A | 4/1980 | Bakule et al. |
| 4,525,571 A | 6/1985 | Burba et al. |

(Continued)

FOREIGN PATENT DOCUMENTS

| CN | 101624385 | 1/2010 |
| CN | 103497311 | 1/2014 |

(Continued)

OTHER PUBLICATIONS

EIC 1700 structure search 15737388-618427 (Year: 2020).*
(Continued)

*Primary Examiner* — Peter A Salamon
(74) *Attorney, Agent, or Firm* — Lynn B. Morreale

(57) ABSTRACT

A latex product composition that includes an anionicaily-stabilized latex; at least one volatile base compound; and one or more water soluble, polymers or polymeric adducts that have a backbone with a plurality of amine functional groups and hydroxyl functional groups. The polymers or polymeric adducts may be an addition product formed from at least one multifunctional amine compound reacted with one or more polyfunctional epoxy compounds, one or more monofunctional epoxy compounds, or a combination thereof. The polymers or polymeric adducts are formed by the addition reaction of the amine compound and the one or more epoxy compounds with 1.3 to 3.8 amine functional (Continued)

group per epoxy functional group. The addition product may be present in about 0.1 to 15.0 wt. % and the at least one volatile base compound is present in about 1.0 wt. % to 10.0 wt. % based on the weight of the particles present in the anionicaily-stabilized latex.

16 Claims, 3 Drawing Sheets

(51) Int. Cl.
    *C09D 5/02*      (2006.01)
    *C09D 133/06*      (2006.01)
    *C09D 7/65*      (2018.01)
    *C08L 25/08*      (2006.01)
    *C08L 57/06*      (2006.01)
    *C09D 5/33*      (2006.01)
    *C09D 125/08*      (2006.01)
    *C09D 157/06*      (2006.01)
    *C09J 11/08*      (2006.01)
    *C09J 157/06*      (2006.01)
    *C08K 5/17*      (2006.01)
    *C08L 25/14*      (2006.01)

(52) U.S. Cl.
    CPC ............ *C09D 5/004* (2013.01); *C09D 5/024* (2013.01); *C09D 7/65* (2018.01); *C09D 125/08* (2013.01); *C09D 133/06* (2013.01); *C09D 157/06* (2013.01); *C09J 11/08* (2013.01); *C09J 157/06* (2013.01); *C08K 5/17* (2013.01); *C08L 25/14* (2013.01); *C08L 2201/52* (2013.01)

(56) References Cited

U.S. PATENT DOCUMENTS

| | | | | |
|---|---|---|---|---|
| 5,246,984 | A | * | 9/1993 | Darwen ............... C08G 59/184 523/404 |
| 5,310,770 | A | | 5/1994 | DeGooyer et al. |
| 5,527,853 | A | | 6/1996 | Landy et al. |
| 5,672,379 | A | * | 9/1997 | Schall .................... C09D 5/004 427/137 |
| 5,804,627 | A | * | 9/1998 | Landy .................. C04B 41/009 524/314 |
| 6,075,079 | A | | 6/2000 | Helmer et al. |
| 6,653,369 | B2 | | 11/2003 | Gerlitz et al. |
| 6,734,226 | B2 | | 5/2004 | Hermes |
| 9,212,287 | B2 | * | 12/2015 | Burckhardt ........... C07C 211/27 |
| 10,584,207 | B2 | * | 3/2020 | Grove ..................... C08L 33/08 |
| 2002/0177655 | A1 | * | 11/2002 | Pratt ....................... C08L 33/06 524/802 |
| 2014/0107313 | A1 | * | 4/2014 | Burckhardt ............ C08G 59/50 528/87 |
| 2018/0162997 | A1 | * | 6/2018 | Kim ...................... C09D 157/06 |

FOREIGN PATENT DOCUMENTS

| | | |
|---|---|---|
| EP | 0 758 660 A2 | 2/1997 |
| WO | WO 02/22709 A1 | 3/2002 |
| WO | WO 2014/060456 A2 | 4/2014 |

OTHER PUBLICATIONS

Generation of a Focused Poly(amino ether) Libary: Polymer-Mediated Transgene Delivery and Gold-Nanorod Bsed Theranostic Systems.
Lucas Vu, et al—Ivysrinig International Publishing 2012; 2(12) 1160-1173 doi: 10.7150/thno.4492.

* cited by examiner

LATEX PRODUCTS HAVING POLYMERS AND POLYMER ADDUCTS AS QUICK-SETTING ADDITIVES

CROSS-REFERENCE TO RELATED APPLICATIONS

This application is a national stage application under 35 U.S.C. § 371 of PCT/US2016/037750 filed Jun. 16, 2016, which claims benefit to U.S. patent application Serial Nos. 62/183,324, filed Jun. 23, 2015, and 62/319,465, filed Apr. 7, 2016.

FIELD OF THE INVENTION

This disclosure relates generally to aqueous compositions used as coatings, inks, adhesives, and the like that incorporate a water soluble, quick-setting additive. More specifically, this disclosure relates to aqueous compositions that include latex particle dispersions with water soluble polymers or polymeric adducts being mixed therewith.

BACKGROUND OF THE INVENTION

The statements in this section merely provide background information related to the present disclosure and may not constitute prior art.

Latex products are widely used in a variety of coatings, adhesives, and inks because they offer several benefits, including the ease in which they can be handled and the absence of any substantial amount of volatile organic compounds (VOCs). One specific example of such a latex product is the acrylic latex compositions used in traffic marking paints. Due to the market demand for products that exhibit a shortened setting time, the coating industry has widely adopted coagulation technology for use in latex products. Within the confines of such coagulation technology, protonated polyfunctional amines destabilize the anionically-stabilized latex particles present in the latex products after they are coated onto a substrate. However, in order to retain the stability of the modified latex particles in the latex product prior to application (e.g., during storage), a volatile amine is added to the latex product in order to increase the pH to a level that prevents the protonation of the polyfunctional amine. When the latex product is applied on to a substrate, the volatile amine escapes or evaporates from the applied coating composition. The loss of the volatile amine results in a decrease in the pH of the applied latex coating composition. The decrease in pH triggers the coagulation of the latex particles in the applied coating composition, which results in a faster setting time.

Numerous polyfunctional amine compounds have been utilized as quick-setting additives for latex products. U.S. Pat. No. 5,804,627 discloses a shelf-stable fast-cure aqueous coating that contains an anionically-stabilized latex, a polyfunctional amine, and a volatile base in an amount sufficient to prevent the protonation of the amine.

In another approach to achieve the fast setting time, manufacturers of latex products tend to add a fast evaporating solvent, such as methanol, into the latex products. However, the addition of fast-evaporating methanol into latex products often leads to instability of the latex products prior to their utilization (e.g., upon storage) when polyfunctional amines with high basicity are present because of their tendency to coagulate the anionically-stabilized latex particles that are present in the latex products. Consequently, achieving both quick setting and stability in the presence of methanol remains a challenge for the formulation of latex products that can be broadly utilized by the coating industry.

SUMMARY OF THE INVENTION

The present invention generally provides a latex product composition that comprises, consists of, or consists essentially of an anionically-stabilized latex, at least one volatile base compound, and one or more polymers or polymeric adducts having a backbone that comprises a plurality of amine functional groups and hydroxyl functional groups. The polymers or polymeric adducts may be water soluble and have a number average molecular weight in the range of about 200 to about 1,000,000 Daltons, as well as comprise a nitrogen atom percentage of 5 to about 35%.

According to one aspect of the present disclosure, the polymers or polymeric adducts may be an addition product formed from at least one multifunctional amine compound reacted with one or more polyfunctional epoxy compounds, one or more monofunctional epoxy compounds, or a combination thereof; wherein the amine compound and the one or more epoxy compounds provide 1.3 to 3.8 amine functional group per epoxy functional group. The polyfunctional epoxy compounds may comprise epoxides of unsaturated hydrocarbons and fatty acids/oils, epoxy ethers of multifunctional alcohols, or combinations thereof and the monofunctional epoxy compounds may comprise epoxy ethers of monofunctional alcohols, epoxy esters of monofunctional alcohols, or combinations thereof. The multifunctional amine compounds may be selected from the group of ethylene diamine, butylene diamine, diethylene triamine, hexamethylene triamine, triethylene tetramine, polyoxyethylene amines, 2-methyl pentamethylene diamine, 1,3-diamino propane, 1,4-diamino butane, 1,5-diamino pentane, 1,6-diamino hexane, 1,2-diamino cyclohexane, isophorone diame, tetraethylene pentamine, 4,4'-methylene-bis-cyclohexyl amine, bis(3-methyl-4aminocyclohexyl) methane, 2,2-bis(3-methyl-4-aminocyclohexyl) propane, 2,6-bis(aminomethyl) norborane, cyclohexane diamine, 3,4-diamino furan, phenylene diamine, 2,4-diamino toluene, polyalkylene oxide diamine, polyalkylene oxide triamine, 2,6 diamino toluene and the combinations thereof. When desirable, the at least one multifunctional amine compound may be diethylene triamine (DETA) and the one or more polyfunctional epoxy compounds and/or monofunctional epoxy compounds may be ethylene glycol diglycidyl ether (EGDGE), n-butyl glycidyl ether (BGE), polypropylene glycol diglycidyl ether (PPGDGE), or polyethylene glycol diglycidyl ether (PEGDGE).

The polymers, polymeric adducts, and/or addition products of the present disclosure may comprise, consist of, or consist essentially of the formula (F-1):

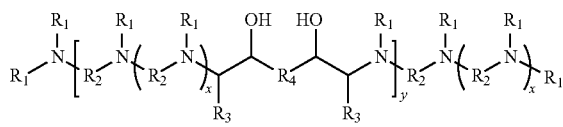

where $R_4$ is alkyl or

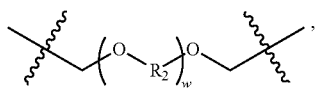

and $R_3$ is hydrogen or alkyl, and $R_2$ is alkyl, and $R_1$ is H, alkyl hydroxide, alkyl ether hydroxide, or

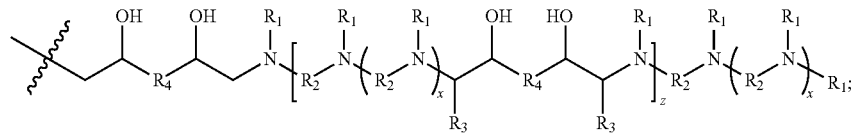

wherein, w, x, y, and z are integers ranging between 1 and 20, between 0 and 10, between 1 and 10,000, and between 0 and 10,000, respectively.

According to another aspect of the present disclosure the polymers, polymeric adducts, or addition products are dissolved in an aqueous medium to form an aqueous solution having a viscosity in the range of about 100 centipoise to about 100,000 centipoise and a pH value of about 8 to about 12 when the aqueous solution comprises 70 wt. % of the polymers, polymeric adducts, or addition products dispersed in the aqueous medium. This aqueous solution exhibits less than about a 30% viscosity change and maintains a transparent appearance when maintained at a temperature of 50° C. for 30 days.

The anionically-stabilized latex may comprise, consist of, or consist essentially of polymer particles dispersed in an aqueous medium with up to 10 wt. % of an anionic surfactant based on the weight of the polymer particles. The polymer particles may be selected as one from the group of an acrylic copolymer, a styrene-acrylic copolymer, a vinyl-acrylic copolymer, a vinyl copolymer, and a combination or mixture thereof.

In the latex product composition, the polymers, polymeric adducts, or addition products may be present in an amount between about 0.1 wt. % and 15.0 wt. % and the at least one volatile base compound is present in an amount between about 1.0 wt. % and about 10.0 wt. % based on the weight of the polymer particles present in the anionically-stabilized latex. The at least one volatile base compound may be selected from the group of ammonia, trimethylamine, triethylamine, dimethylethanolamine, morpholine, n-methyl morpholine, and a mixture or combination thereof.

According to yet another aspect of the present disclosure, the polymers, polymeric adducts, or addition products may be selected as (F-1A)

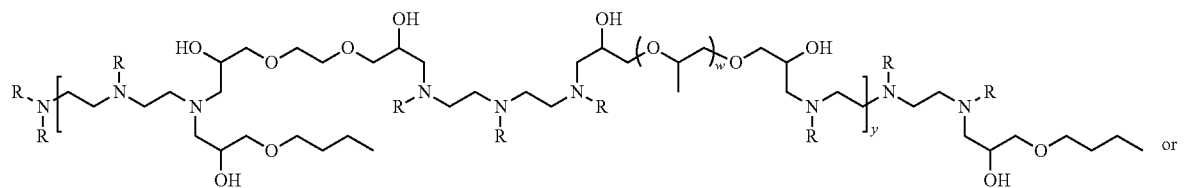

or (F-1B)

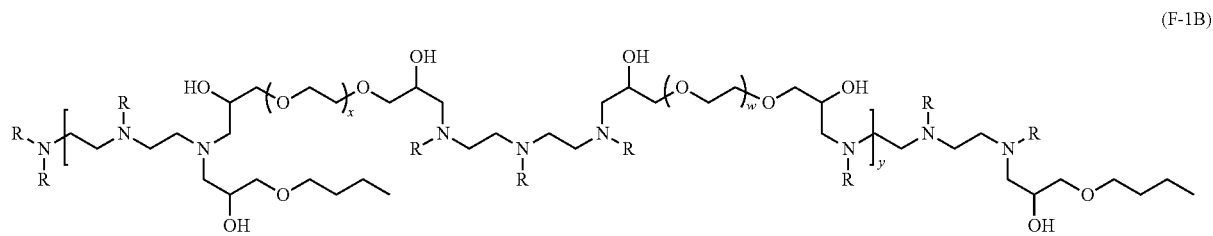

where R is H, alkyl hydroxide, alkyl ether hydroxide, or

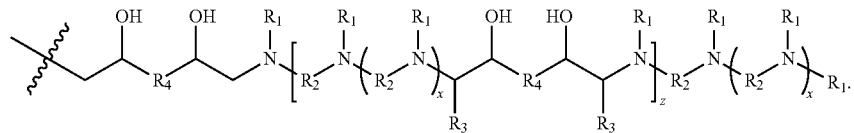

The latex product composition of the present invention may be field and/or factory applied coatings. The latex product composition of the present disclosure may be used as is or incorporated into a variety of products, including but not limited to coatings, paints, adhesives, sealants, caulks, or inks that are utilized without limitation in traffic marking, architectural or decorative (which are used synonymously herein), deck, dry-fall, pressure-sensitive adhesives (PSA), roof, cementitious, and primer applications, among others. A coating formed using the latex product composition is track-free or dry-through in a time that is at least 25% faster than the time required for a similar latex composition that uses no polyamine additive to be tack-free or dry-through.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
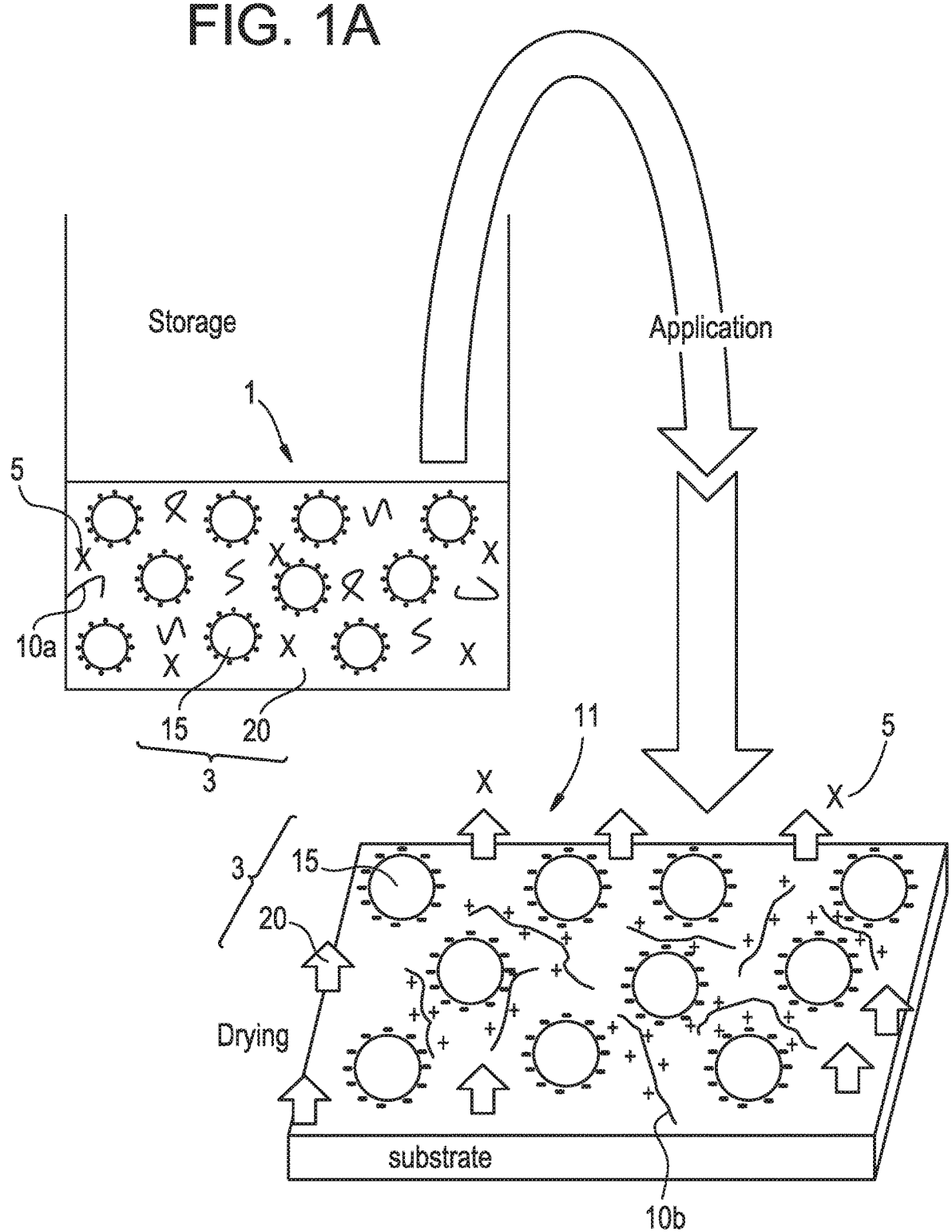
FIG. 1a is a schematic representation of a latex product composition prepared according to the teachings of the present disclosure placed into a container for storage.
FIG. 1b is a schematic representation of the fast drying mechanism associated with a latex product composition of FIG. 1a after being applied to a substrate.

The following description is merely exemplary in nature and is in no way intended to limit the present disclosure or its application or uses. For example, the latex products made and used according to the teachings contained herein are described throughout the present disclosure in conjunction with a traffic marking paint in order to more fully illustrate the composition and the use thereof. The incorporation and use of such latex products as a coating in other applications or as an ink, a paint, an adhesive, a caulk, a sealant, a mastic, or the like are contemplated to be within the scope of the present disclosure. It should be understood that throughout the description, corresponding reference numerals indicate like or corresponding parts and features.

Referring to FIG. 1a, the composition of the latex products (1) of the present disclosure generally comprises, consists of, or consists essentially of an anionically-stabilized latex (3), at least one volatile base compound (5), and one or more polymers or polymeric adducts (10a). The anionically-stabilized latex (3) represents a stable emulsion of polymer particles (15) dispersed in an aqueous medium (20). The aqueous medium (20) may comprise water as the primary solvent or diluent either alone or as a mixture with one or more co-solvents or secondary solvents. The polymers or polymeric adducts (10a) represent compounds that are formed by the combination of amine and epoxy reactants via covalent bonds.

The amount of water in the anionically-stabilized latex (3) may range between about 30 wt. % to about 70 wt. %; alternatively, between 40 wt. % to about 60 wt. % based on the overall weight of the anionically-stabilized latex (3). One or more co-solvents may be optionally incorporated into the latex in an amount that ranges between about 0 wt. % to about 30 wt. %; alternatively, between 5 wt. % to about 25 wt. % based on the overall weight of the anionically-stabilized latex. The co-solvent may include coalescence aids and fast evaporating solvents that can assist in film formation and/or the quick drying behavior exhibited by traffic marking paints and other latex coatings. Several examples of co-solvents include without limitation methyl alcohol, propylene and ethylene glycol ethers, propylene and ethylene glycols, and 2,2,4-Trimethyl-1,3-pentanediol monoisobutyrate (e.g., Texanol®, Eastman Chemical Co.). Alternatively, the co-solvent is methyl alcohol or methanol.

The polymer particles (15) in the anionically-stabilized latex (3) may be a polymer or copolymer prepared from monomers that include without limitation methyl acrylate, methyl methacrylate, butyl acrylate, butyl methacrylate, styrene, butadiene, ethylene, vinyl acetate, vinyl versatate, vinyl chloride, acrylonitrile, acrylic acid, and methacrylic acid, among others. The polymer particles may also be derived from one or more ethylenically unsaturated acid monomers or their corresponding esters, including but not limited to acrylic and methacrylic esters. Alternatively, the polymer particles comprise without limitation an acrylic copolymer, a styrene acrylic copolymer, a vinyl acrylic copolymer, a vinyl copolymer, and a mixture or combination thereof. The polymer particles may exhibit a glass transition temperature between about 0° C. to about 90° C.

The anionic charge on the polymer particles (15) may be obtained by any means known to one skilled in the art, including but not limited to the inclusion of acid groups within or on surface of the polymer particles. Several specific examples of such acid groups are those derived from maleic acid, vinyl sulfonic acid, acrylic acid, and methacrylic acid to name a few. The negative charge may also arise through the use of anionic surfactants and dispersants used to disperse the polymer particles into the aqueous medium. These surfactants or dispersants may include without limitation salts of fatty rosin and naphthenic acids, condensation products of sulfonic acid and formaldehyde, carboxylic polymers, alkyl sulfates, alkyl aryl sulfonates, and sulfosuccinates. The amount of anionic surfactant or dispersant utilized may range up to 10.0 wt. % based on the weight of the polymer particles. Alternatively, the amount of surfactant used is greater than 0.1 wt. % based on the weight of the polymer particles. When desirable, the amount of anionic surfactant that is utilized is within the range of about 0.5 wt. % to about 8.0 wt. %; alternatively, between about 1.0 wt. % and 7.0 wt. % based on the weight of the polymer particles. Further details regarding an anionically-stabilized latex is provide in U.S. Pat. No. 5,804,627 issued to F. Landy et al. on Sep. 8, 1998, the entire disclosure of which is hereby incorporated by reference. When desirable, the latex compositions may also include one or more non-ionic and/or cationic surfactants or dispersants, as well as other additives.

The volatile base compound (5) present in the latex product (1) raises the pH of the latex product (1) to be at or above the point at which substantially all of the amine functional groups present in the polymeric adduct (10a) are in a nonionic or non-protonated state. The volatile base compound (5) may include but not be limited to ammonia, trimethylamine, triethylamine, dimethylethanolamine, morpholine, n-methyl morpholine, and a mixture or combination thereof. Alternatively, the volatile base compound is ammonia. The amount of volatile base compound (5) to be added into the latex product (1) can be predetermined as being equivalent to or greater than the number of equivalents necessary to interact with each acidic functional group present in the polymer particles (15). Alternatively, the amount of volatile base compound (5) may range from about 2 to about 5 times greater than the number of equivalents necessary to interact with each acidic functional group present in the polymer particles (15). Alternatively, the amount of volatile base compound (5) present in the latex product ranges between about 1 wt. % and about 10 wt. % based on the weight of the polymer particles (15) present in the anionically-stabilized latex (3).

The polymers and polymeric adducts (10a) may have a polymeric backbone that comprises, consists of, or consists essentially of a plurality of segments with amine functional groups and hydroxyl functional groups. The polymers and polymeric adducts (10a) generally comprise hydroxy functional groups and/or alkylene ether and/or alkyl groups located between two neighboring amines present in the polymer backbone. The polymer backbone may be defined as the series of covalently bounded atoms that together create the chain of the molecule. The polymers and polymeric adducts (10a) may be formed as an addition product arising from the reaction of one or more multifunctional amine compounds with one or more multifunctional and/or one or more monofunctional epoxy compounds. Alternatively, the polymers and polymeric adducts may be formed as an addition product of at least one multifunctional amine compound and a plurality of epoxy compounds; alternatively, three or more epoxy compounds are utilized. The polymers and polymeric adducts may be formed by reacting an amine compound with one or more epoxy compounds, such that there are 1.3 to 3.8 reactive amine functional groups per reactive epoxy functional group; alternatively, between 1.5 to 3.5 amine functional groups per epoxy functional group; alternatively, between 2.0 to 3.0 amine functional groups per epoxy functional group.

The polymers and polymeric adducts (10a) are water soluble. The polymers or polymeric adducts (10a) are present in the latex product (1) in an amount between about 0.1 wt. % and 15.0 wt. % based on the weight of the polymer particles (15) present in the anionically-stabilized latex (3). Alternatively, the polymers or polymeric adducts (10a) may be present in the latex product (1) in an amount between about 0.5 wt. % and 5.0 wt. %.

In the context of the present disclosure, the term "water-soluble" means that a homogeneous and transparent solution is formed upon blending the polymers or polymeric adducts with water without the addition of any co-solvent. The term "transparent solution" means that the solution transmits 90% or more of impinging visible light having a wavelength of 540 nm. Transmittance of visible light having a 540 nm wavelength may be measured via any conventional spectrophotometry method. The term "adducts" represents compounds that are formed by the combination of amine and epoxy reactants via covalent bonds. The aqueous solution of the polymers or polymeric adducts formed according to the teachings of the present disclosure exhibits sufficient stability. The term "sufficiently stable" or "sufficient stability" means that the aqueous solution of polymeric adducts exhibits less than about a 30% viscosity change and maintains the transparent appearance when maintained at a temperature of 50° C. for 30 days. The viscosity is determined according to ASTM method D-2196 (ASTM International, West Conshohocken, Pa.).

The polymers and polymeric adducts (10a) prepared according to the teachings of the present disclosure provide flexibility in controlling the distance between the amine functional groups. The degree of hydrophobicity exhibited by the polymers and polymeric adducts (10a) can be changed by altering the number of carbon atoms in the chain located between the neighboring amine groups in the multi-functional amine compound and the number of alkyl and/or alkylene ether linkages located between the epoxy groups in the multi-functional epoxy compound, the type of alkyl and/or alkylene ether linkages provided between the epoxy groups in the multi-functional epoxy compound, as well as the type of alkyl group attached to the mono-epoxy compound. Thus the polymers and polymeric adducts can be formed that can impart different degrees of hydrophobicity when desired. This flexibility allows the structure of the polymers and polymeric adducts (10a) to be tailored in order to achieve both methanol stability and the desired quick setting property when incorporated into a latex product by selecting the appropriate multifunctional amine compound(s) and multifunctional/mono-functional epoxy compound(s) from which the polymers and polymeric adducts are formed.

In addition, the number of alkyl and/or alkylene ether groups located between the epoxy groups present in the multifunctional epoxy compound(s) may also affect the degree of hydrophobicity associated with the polymers and polymeric adducts (10a). A longer alkyl and/or alkylene ether linkage located between the epoxy groups can result in more hydrophobic polymers and polymeric adducts (10a). Furthermore, the use of a propylene ether linkage located between the epoxy groups forms more hydrophobic polymers or polymeric adducts (10a) than the use of an ethylene ether linkage located between the epoxy groups.

The epoxy compounds used to form the polymers and polymeric adducts may include polyfunctional epoxy compounds, monofunctional epoxy compounds, or a combination thereof. The polymers and polymeric adducts also exhibit a number average molecular weight that is in the range of about 200 to about 1,000,000 unified amu or Daltons as measured by gel permeation chromatography; alternatively between 200 to 500,000 Daltons; alternatively, between 200 to 200,000 Daltons. The polymers or polymeric adducts may be either collected or dissolved in water. These polymers or polymeric adducts also comprise a nitrogen atom percentage in the range of 5 to about 35%, wherein the nitrogen atom percentage ($N_{atom}$%) is calculated according to Equation (1):

$$N_{atom}\% = 100 \times \frac{\Sigma(14.007 \times N_A \times M_A)}{W_R}, \qquad \text{Eq. (1)}$$

where $N_A$ is the number of nitrogen atoms per multifunctional amine, $M_A$ is the molar quantity of the multifunctional amine, and $W_R$ is the total weight of the reactants. Alternatively, the nitrogen atom percentage of the polymers or polymeric adducts is between about 10% to about 20%.

The polymers and polymeric adducts may correspond to a formula defined as (F-1) below, where w, x, y, and z are integers ranging between 1 and 20, 0 and 10, between 1 and 10,000, and between 0 and 10,000, respectively. The integer y may, alternatively, be 10 to about 5000. When desirable, the integer y may be about 20 to about 1000.

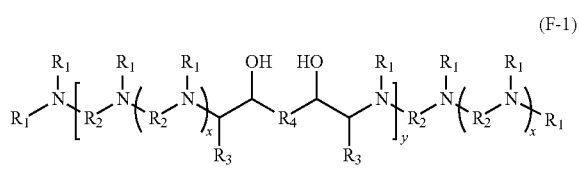

(F-1)

where $R_4$ is alkyl or

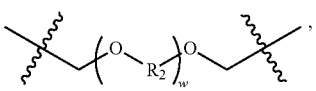

and $R_3$ is hydrogen or alkyl, and $R_2$ is alkyl, and $R_1$ is H, alkyl hydroxide, alkyl ether hydroxide, or

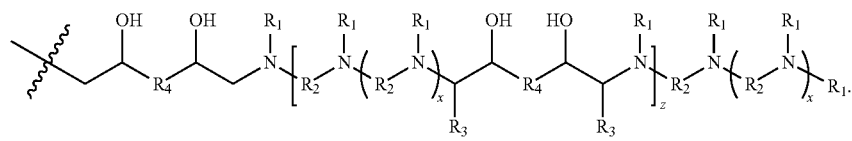

These polymers and polymeric adducts may comprise 1.3 to 3.8 amine functional groups per hydroxyl functional group. Alternatively, the polymers and polymeric adducts may comprise 1.5 to 3.5 amine functional groups per hydroxyl functional group; alternatively, 2.0 to 3.0 amine functional groups per hydroxyl functional group.

According to one aspect of the present disclosure, the polymers or polymeric adducts may be mixed with the anionically-stabilized latex by any means known to one skilled in the art including, but not limited to milling, shaking, stirring, high shear mixing, planetary or other low shear mixing techniques, and combinations thereof. The aqueous solution of the polymers or polymeric adducts is sufficiently stable and exhibits a viscosity that is in the range of about 100 centipoise to about 100,000 centipoise when the solution comprises about 70 wt. % of the polymers or polymeric adducts dissolved in water. When desirable the viscosity is between about between 100 centipoise to about 50,000 centipoise; alternatively, between 100 centipoise to 10,000 centipoise. The weight percent of the polymeric adducts in aqueous solution may be measured according to ASTM test method D-1259 (ASTM International, West Conshohocken, Pa.).

The aqueous solution also exhibits a pH value of about 8 to about 12; alternatively, about 9 to about 11; alternatively, less than about 10.5. The pH value of the blends of latex and polymeric adducts is measured using a pH probe at 25° C. Further details regarding the water soluble polymeric adducts of the present disclosure and the aqueous solutions prepared therefrom are provided in U.S. Provisional Application No. 62/183,304 filed on Jun. 23, 2015 by K-J. Kim, R. Hu, and J. L. Grove entitled "Water Soluble Polymers and Polymeric Adducts Along With Aqueous Solutions Thereof" (IR 4257PSP), the entire disclosure of which is hereby incorporated by reference.

When the polymers and polymeric adducts or an aqueous solution of these polymers or adducts are mixed with an anionically-stabilized latex and at least one volatile base compound, the resulting latex product surprisingly exhibits sufficient stability and excellent storage stability when formulated to a paint. For example, a paint formulated with the latex product may exhibit, when desired, less than about a 10 Krebs unit (KU) viscosity change when maintained a temperature of 120° F. for at least 7 days or when it is maintained at a temperature of 140° F. for 7 days.

Further details regarding the use of the water-soluble polymeric adducts of the present disclosure are provided in U.S. Provisional Application No. 62/183,291 filed on Jun. 23, 2015 by J. L. Grove, K-J. Kim, R. Hu, and W. Devonport entitled "Quick-Setting Coating Compositions with Stability at low pH and Water Resistance" (IR 4262PSP), the entire content of which is hereby incorporated by reference.

The molecular weight of the polymers or polymeric adducts can also affect the storage stability and fast-setting property of the latex products formed therefrom. The molecular weight of the polymers and polymeric adducts of the present invention can be manipulated by the proper selection of the number of amine functional groups present in the multifunctional amine reactant, the number of epoxy groups present in the epoxy reactants, and/or the equivalent ratio of amine to epoxy functional groups present. A higher molecular weight can be obtained using a multifunctional amine reactant having a higher number of amine functional groups per molecule, epoxy reactants having a higher number of epoxy groups per molecule, or when the ratio of amine to epoxide is close to unity (e.g., 1:1).

The polyfunctional or multi-functional epoxy compounds that can be used to form the polymers or polymeric adducts may comprise, consist of, or consist essentially of epoxides of unsaturated hydrocarbons and fatty acids/oils, epoxy ethers of multifunctional alcohols, or mixtures and combinations thereof. The epoxides of unsaturated hydrocarbons and fatty acids/oils may include, without limitation, the epoxides of vinyl cyclohexene, dicyclopentadiene, cyclohexadiene, cyclododecadiene, cyclododecatriene, isoprene, 1,6-hexadiene, butadiene, polybutadiene, divinyl benzene, castor oil, soybean oil and mixtures or combinations thereof. The epoxy ethers of multifunctional alcohols may include, but not be limited to, trimethyol propane triglycidyl ether, pentaerythritol tetraglycidyl ether, trimethyol ethane triglycidyl ether, ethylene glycol diglycidyl ether, sorbitol glycidyl ethers, 2-methyl-1,3-propane diol diglycidyl ether, neopentyl glycol diglycidyl ether, 2,2,4-trimethyl pentanediol diglycidyl ether, propylene glycol diglycidyl ether, hydrogenated bisphenol A diglycidyl ether, 1,4-butanediol diglycidyl ether, 1,6-hexanediol diglycidyl ether, polyethylene glycol diglycidyl ether, polypropylene glycol diglycidyl ether, and combinations thereof. Alternatively, the multifunctional epoxy compounds may include ethylene glycol diglycidyl ether, polypropylene glycol diglycidyl ether, or polyethylene glycol diglycidyl ether, and mixtures thereof.

The monofunctional epoxy compounds that can be used to form the polymeric adducts may comprise, consist of, or consist essentially of epoxy ethers of monofunctional alcohols, epoxy esters of monofunctional alcohols, or mixture and combinations thereof. The epoxy ethers of monofunctional alcohols may include, without limitation, ethyl glycidyl ether, n-propyl glycidyl ether, isopropyl glycidyl ether, n-butyl glycidyl ether, isobutyl glycidyl ether, t-butyl glycidyl ether, n-amyl glycidyl ether, iso-amyl glycidyl ether, t-amyl glycidyl ether, n-hexyl glycidyl ether, cetyl glycidyl ether, benzyl glycidyl ether, 2,3-dimethoxy benzyl glycidyl ether, diacetone glycidyl ether, n-dodecyl glycidyl ether, 2-ethyl hexyl glycidyl ether, and combinations thereof. The monofunctional epoxy esters of monfunctional alcohols may include, but not be limited to, glycidyl acetate, glycidyl neopentanoate, glycidyl 2-ethylhexanoate, glycidyl neodecanoate and combinations thereof. Alternatively, the monofunctional epoxy compounds may include n-butyl glycidyl ether, isobutyl glycidyl ether, or t-butyl glycidyl ether, and mixtures thereof.

The multifunctional amines that can be used to form the polymeric adducts may include, without limitation, ethylene diamine, butylene diamine, diethylene triamine, hexamethylene triamine, triethylene tetramine, polyoxyethylene amines, 2-methyl pentamethylene diamine, 1,3-diamino propane, 1,4-diamino butane, 1,5-diamino pentane, 1,6-diamino hexane, 1,2-diamino cyclohexane, isophorone diamine, tetraethylene pentamine, 4,4'-methylene-bis-cyclohexyl amine, bis(3-methyl-4-aminocyclohexyl) methane, 2,2-bis(3-methyl-4-aminocyclohexyl) propane, 2,6-bis (aminomethyl) norborane, cyclohexane diamine, 3,4-diamino furan, phenylene diamine, 2,4-diamino toluene, polyalkylene oxide diamine, polyaklylene oxide triamine, 2,6-diamino toluene and the mixtures or combinations thereof. Alternatively, the multifunctional amines may be diethylene triamine, hexamethylene triamine, or triethylene tetramine, and combinations thereof.

According to another aspect of the present disclosure, the amine compound or reactant is provided in the range of about 25 wt. % to about 60 wt. % and the epoxy compounds or reactants are provided in the range of about 40 wt. % to about 75 wt. % relative to the combined weight of the amine and epoxy reactants. Alternatively, the amine reactant is provided in the range of about 30 wt. % to about 50 wt. % and the epoxy reactants are provided in the range of about 50 wt. % to about 70 wt. % relative to the combined weight of the amine and epoxy reactants.

When desirable, the amine reactant may be diethylene triamine (DETA) and the epoxy reactants may be a mixture of ethylene glycol diglicidyl ether (EGDGE), n-butyl glycidyl ether (BGE), and polypropylene glycol diglycidyl ether (PPGDGE) or polyethylene glycol diglycidyl ether (PEGDGE). The resulting polymers and polymeric adducts formed therefrom may be represented by formula (F-1A) or (F-1B).

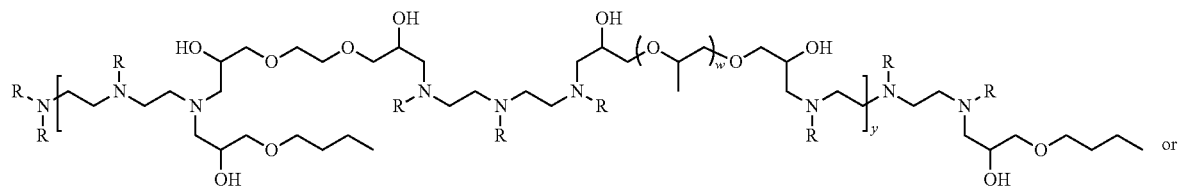

(F-1A)

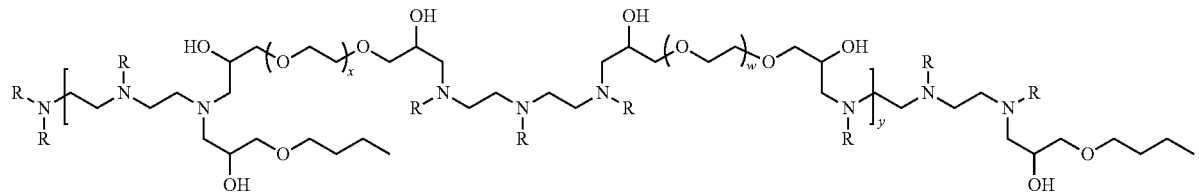

(F-1B)

where R is H, alkyl hydroxide, alkyl ether hydroxide, or

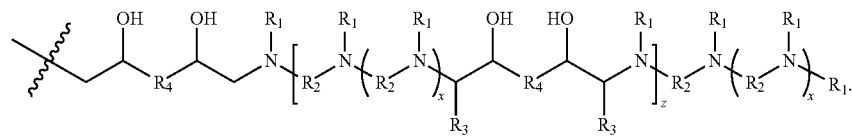

The following Table 1 includes a non-exhaustive list of possible amine epoxy combinations that may be used to form the polymeric adducts according to the teachings of the present disclosure.

TABLE 1

Several Specific Combinations of Reactants Used to Form Polymeric Adducts (PA)

| #    | Amine | Epoxy 1 | Epoxy 2 | Epoxy 3 |
|------|-------|---------|---------|---------|
| PA-1 | DETA  | EGDGE   | BGE     | PPGDGE  |
| PA-2 | DETA  | EGDGE   | —       | —       |
| PA-3 | DETA  | EGDGE   | BGE     | —       |
| PA-4 | DETA  | EGDGE   | EHGE    | PPGDGE  |
| PA-5 | DETA  | EGDGE   | BGE     | PEGDGE  |

The reactants associated with the abbreviations used in Table 1 include diethylene triamine (DETA), ethylene glycol diglycidyl ether (EGDGE), n-butyl glycidyl ether (BGE), 2-ethylhexyl glycidyl ether (EHGE), polypropylene glycol diglycidyl ether (PPGDGE), and polyethylene glycol diglycidyl ether (PEGDGE).

The storage stability of a latex product containing an anionically-stabilized latex and polymeric adducts largely depends on the likelihood of coagulation between the two components in the aqueous phase. The basicity and molecular weight of the polymers or polymeric adducts can be manipulated to prevent the interaction with the polymer particles in the anionically-stabilized latex during storage and to promote coagulation with the polymer particles during the film forming stage during application. Referring now to FIG. 1b, the latex product (1) is applied to a substrate by any means known to one skilled in the art, including but not limited to roll coating, spray coating, spin coating, dip coating, brushing, screen printing, ink jet application, and streaming, to name a few. Spray coating includes airless spray, air spray, high volume low pressure (HVLP) air spray, and air-assisted airless spray, among others.

Once the latex product (1) is applied to the substrate, the aqueous medium (20) and the volatile base component (5) begins to evaporate and the formation of a film (11) begins to occur. The evaporation of the volatile base component (5) causes the pH of the latex product (1) to decrease, which in turn allows the amine functionality in the polymers or polymeric adducts (10b) to become positively charged (protonation). The evaporation of the aqueous medium (5) causes the positively charged polymers or polymeric adducts (10b) to interact with the negatively charged polymer particles (15), thereby facilitating flocculation.

The latex compositions may further comprise, consist of, or consist essentially of one or more additional polymers, which may or may not be anionically-stabilized, as well as any other known or desired additives. The additional polymer may include, but not be limited to, a polymer or copolymer that is derived from one or more of (meth) acrylate, vinyl aromatic, ethylenically unsaturated aliphatic, or vinyl ester monomers, as well as various combinations thereof. A formulated coating composition containing the latex product (1) could be prepared through blending, mixing, or the like, with other additives known to those skilled in the art. The other additives, may comprise without limitation, any type of pigments or colorants, fillers, dispersants or surfactants, coalescent agents, pH neutralizing agents, plasticizers, defoamers, surfactants, thickeners, biocides, co-solvents, rheology modifiers, wetting or spreading agents, leveling agents, conductive additives, adhesion promoters, anti-blocking agents, anti-cratering agents or anti-crawling agents, anti-freezing agents, corrosion inhibitors, anti-static agents, flame retardants, optical brighteners, UV absorbers or other light stabilizers, chelating agents, cross-linking agents, flattening agents, flocculants, humectants, insecticides, lubricants, odorants, oils, waxes or anti-slip aids, soil repellants, or stain resistant agents, as well as mixtures and combinations thereof. The selection of additives incorporated into a coating composition is determined based on a variety of factors, including the nature of the polymer or latex dispersion and the intended use of the coating composition, to name a few.

Several examples of pigments and colorants include, without limitation, metal oxides, such as titanium dioxide, zinc oxide, or iron oxide, as well as organic dyes, or combinations thereof. Examples of fillers may include, but not be limited to, calcium carbonate, nepheline syenite, feldspar, diatomaceous earth, talc, aluminosilicates, silica, alumina, clay, kaolin, mica, pyrophyllite, perlite, baryte, or Wollastonite, and combinations thereof.

Several examples of co-solvents and plasticizers include ethylene glycol, propylene glycol, diethylene glycol, and combinations thereof, among others. Typical coalescents, which aid in film formation during drying, include but are not limited to, ethylene glycol monomethyl ether, ethylene glycol monobutyl ether, ethylene glycol monoethyl ether acetate, ethylene glycol monobutyl ether acetate, diethylene glycol monobutyl ether, and diethylene glycol monoethyl ether acetate, as well as combinations thereof.

Several examples of dispersants may include, without limitation, any known nonionic surfactants, such as ammonium, alkali metal, alkaline earth metal, and lower alkyl quaternary ammonium salts of sulfosuccinates, higher fatty alcohol sulfates, aryl sulfonates, alkyl sulfonates, alkylaryl sulfonates and/or ionic surfactants, such as alkylphenoxy polyethoxyethanols or ethylene oxide derivatives of long chain carboxylic acids, as well as polyacid dispersants, such as polyacrylic acid or polymethylacrylic acid or salts thereof, and hydrophobic co-polymeric dispersants, such as co-polymers of acrylic acid, methacrylic acid, or maleic acid with hydrophobic monomers.

Several examples of the thickening agents may include, without limitation, hydrophobically-modified ethylene oxide urethane (HEUR) polymers, hydrophobically-modified alkali soluble emulsion (HASE) polymers, hydrophobically-modified hydroxyethyl celluloses (HMHECs), hydrophobically-modified polyacrylamide, and combinations thereof.

The incorporation of various defoamers, such as, for example, polydimethylsiloxanes (PDMS) or polyether-modified polysiloxanes, may be done to minimize foaming during mixing and/or application of the coating composition. Suitable biocides can be incorporated to inhibit the growth of bacteria and other microbes in the coating composition during storage.

Coatings, which may include, without limitation, paints, adhesives, sealants, caulks, and inks, formed from the latex compositions described herein, as well as methods of forming these coatings are believed to be within the scope of the present disclosure. Generally, coatings are formed by applying a coating formulation described herein to a surface, and allowing the coating to dry to form the coating or film. The resulting dried coatings typically comprise, at minimum, the non-volatile components of an anionically-stabilized latex and the polymers or polymer adducts of the present disclosure. The coating formulations and/or the dried coatings can further comprise one or more additional polymers and/or additives as described above or known to one skilled in the art. The coating thickness can vary depending upon the application of the coating. The thickness of the coating may be any thickness desirable for use in a particular application;

alternatively, the range for the dry thickness of the coating is between about 0.025 mm (1 mil) to about 2.5 mm (100 mils).

The coating formulations can be applied to a variety of different surfaces including, but not limited to metal, asphalt, concrete, stone, ceramic, wood, plastic, polymer, polyurethane foam, glass, and combinations thereof. The coating compositions can be applied to the interior or exterior surfaces of a commercial product or manufactured good or item. When desirable, the surface may be an architectural surface, such as a roof, a wall, a floor, or a combination thereof.

According to one aspect of the present disclosure, each coating formulation may be formulated to meet the requirements for use in a specific application area, including but not limited to, traffic paint, decorative or architectural, pressure sensitive adhesive, deck, "dry-fall", roof, cementitious, and primer applications, as further highlighted by the following examples. The coating formulation used in each of these applications may be formulated such that it comprises the latex product composition, as previously described above or further defined herein, and optionally, one or more additional polymers or other known or desired additives. The latex composition used in these coating formulations, generally, includes an anionically-stabilized latex; at least one volatile base compound; and either one or more of polymers comprising the formula (F-1); an addition product formed by reacting at least one multifunctional amine compound with one or more poly-functional and/or mono-functional epoxy compounds; or a polymeric adduct that has a backbone comprised of a plurality of amine functional groups and hydroxyl functional groups.

The latex coating formulations that are formulated according to the teachings of the present disclosure for use in traffic paint applications generally exhibit better stability at lower pH values (e.g. pH ranges from 9-11), equivalent dry (setting) time and water-resistance compared to a conventional latex traffic paint that includes polyethyleneimine. The latex coating formulations of the present disclosure that are formulated for use in decorative or architectural applications, also exhibit good stability at low pH values (e.g. pH ranges from 7-10), as well as better performance with respect to substrate adhesion and/or the amount of time required to become tack free or dry-through than conventional latex coating formulations that do not contain the polymer and polymeric adduct of the present invention. Similarly, the latex coating formulations of the present disclosure that are used as pressure sensitive adhesives (at pHs ranging from 6 to 9), deck coatings (pHs ranging from 7 to 9), or "dry-fall" coating applications (pH ranging from 7 to 9), exhibit good stability, faster setting performance, and enhanced water resistance and/or adhesion to substrates as compared to conventional latex coating formulations that do not contain the polymer and polymeric adduct of the present invention. Additionally, other latex coating formulations that are prepared according to the teachings of the present disclosure, including those coatings or paints formulated for use in roof and primer applications, as well as various sealants, caulks, and inks may exhibit similar characteristics and benefits over conventional latex formulations. Conventional latex compositions include those compositions that do not include any fast-drying additive ("As-Is"), as well as those compositions which include a conventional fast-drying additive, such as polyethyleneimine (PEI).

Aspects of the Invention as Described as Follows:
1. A latex product composition comprising:
   an anionically-stabilized latex;
   at least one volatile base compound; and
   one or more of polymers, the polymers comprising the formula (F-1):

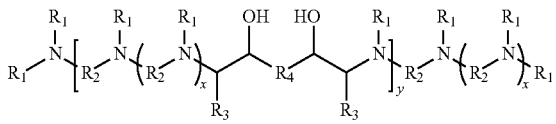

where $R_4$ is alkyl or

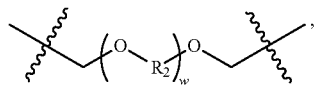

and $R_3$ is hydrogen or alkyl, and $R_2$ is alkyl, and $R_1$ is H, alkyl hydroxide, or alkyl ether hydroxide, or

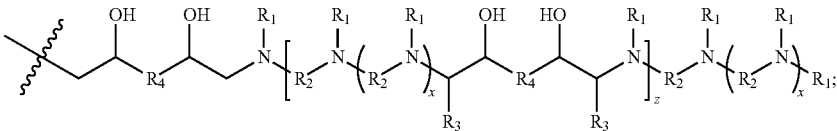

wherein, w, x, y, and z are integers ranging between 1 and 20, between 0 and 10, between 1 and 10,000, and between 0 and 10,000, respectively.

2. The latex product composition according to claim 1, wherein the polymers comprise 1.3 to 3.8 amine functional group per hydroxyl functional group;
   wherein the polymers are water soluble and have a number average molecular weight in the range of about 200 to about 1,000,000 Daltons.

3. The latex product composition according to any of claim 1 or 2, wherein the polymers are dissolved in water to form an aqueous solution having a viscosity in the range of about 100 centipoise to about 100,000 centipoise and a pH value of about 8 to about 12 when the aqueous solution comprises 70 wt. % of the polymers dissolved in the aqueous medium; the aqueous solution exhibits less than about a 30% viscosity change and maintains a transparent appearance when maintained at a temperature of 50° C. for 30 days.

4. The latex product composition according to any of claims 1-3, wherein the anionically-stabilized latex comprises polymer particles dispersed in an aqueous medium with up to 10 wt. % of an anionic surfactant based on the weight of the polymer particles; the polymer particles are selected as one from the group of an acrylic copolymer, a styrene-acrylic copolymer, a vinyl-acrylic copolymer, a vinyl copolymer, and a combination or mixture thereof;
   wherein the polymers are present in an amount between about 0.1 wt. % and 15.0 wt. % and the at least one volatile base compound is present in an amount between about 1.0 wt. % and about 10.0 wt. % based on the weight of the polymer particles present in the anionically-stabilized latex, the at least one volatile base compound is selected from the group of ammonia, trimethylamine, triethylamine, dimethylethanol amine, morpholine, n-methyl morpholine, and a mixture or combination thereof;

5. The latex product composition according to any of claims 1-4, wherein the polymers are selected as 4aminocyclihexyl) methane, 2,2-bis(3-methyl-4-aminocyclohexyl) propane, 2,6-bis(aminomethyl) norborane, cyclohexane diamine, 3,4-diamino furan, phenylene diamine, 2,4-diamino toluene, polyalkylene oxide diamine, polyalkylene oxide triamine, 2,6 diamino toluene and the combinations thereof.

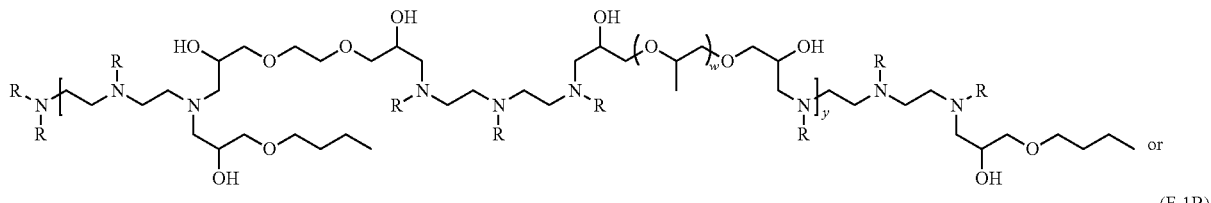

(F-1A)

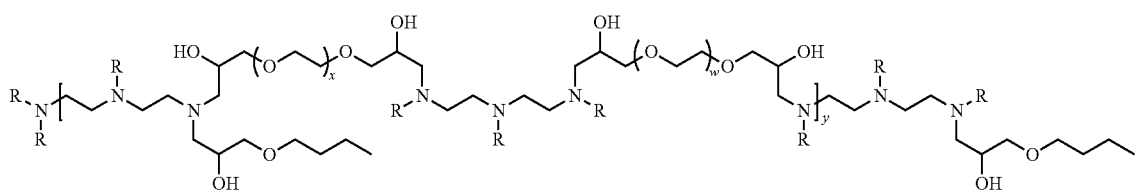

(F-1B)

where R is H, alkyl hydroxide, alkyl ether hydroxide, or

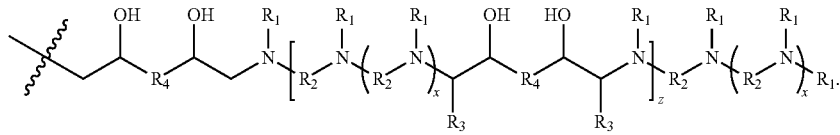

6. A latex product composition comprising:
   an anionically-stabilized latex;
   at least one volatile base compound; and
   an addition product of at least one multifunctional amine compound reacted with one or more polyfunctional epoxy compounds, one or more monofunctional epoxy compounds, or a combination thereof;
   wherein the amine compound and the one or more epoxy compounds provide 1.3 to 3.8 amine functional group per epoxy functional group;
   wherein the addition product is water soluble, has a number average molecular weight in the range of about 200 to about 1,000,000 Daltons, and comprises a nitrogen atom percentage of 5 to about 35%.

7. The latex product composition according to claim 6, wherein the polyfunctional epoxy compounds comprise epoxides of unsaturated hydrocarbons and fatty acids/oils, epoxy ethers of multifunctional alcohols, or combinations thereof and the monofunctional epoxy compounds comprise epoxy ethers of monofunctional alcohols, epoxy esters of monofunctional alcohols, or combinations thereof;
   wherein the multifunctional amine compounds are selected from the group of ethylene diamine, butylene diamine, diethylene triamine, hexamethylene triamine, triethylene tetramine, polyoxyethylene amines, 2-methyl pentamethylene diamine, 1,3-diamino propane, 1,4-diamino butane, 1,5-diamino pentane, 1,6-diamino hexane, 1,2-diamino cyclohexane, isophorone diamine, tetraethylene pentamine, 4,4'-methylene-bis-cyclohexyl amine, bis(3-methyl- 8. The latex product composition according to claim 6, wherein the at least one multifunctional amine compound is diethylene triamine (DETA) and the plurality of polyfunctional epoxy compounds and/or monofunctional epoxy compounds are selected from the group of ethylene glycol diglicidyl ether (EGDGE), n-butyl glycidyl ether (BGE), and polypropylene glycol diglycidyl ether (PPGDGE), and polyethylene glycol diglycidyl ether (PEGDGE).

9. The latex product composition according to any of claims 6-8, wherein the addition product is dissolved in water to form an aqueous solution having a viscosity in the range of about 100 centipoise to about 100,000 centipoise and a pH value of about 8 to about 12 when the aqueous solution comprises 70 wt. % of the addition product; the aqueous solution exhibits less than about a 30% viscosity change and maintains a transparent appearance when maintained at a temperature of 50° C. for 30 days.

10. The latex product composition according to any of claims 6-9, wherein the addition product has the formula (F-1):

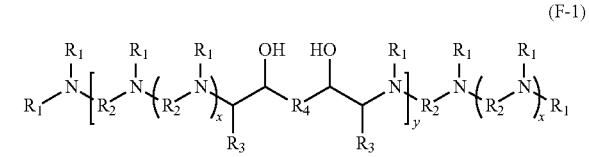

(F-1)

where R₄ is alkyl or

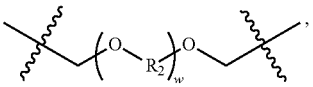

and R₃ is hydrogen or alkyl, and R₂ is alkyl, and R₁ is H, alkyl hydroxide, alkyl ether hydroxide, or

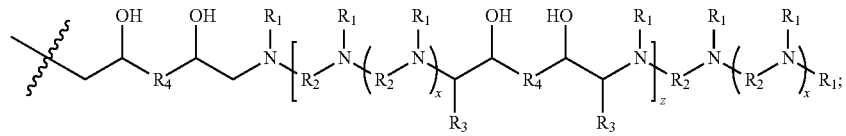

wherein, w, x, y, and z are integers ranging between 1 and 20, between 0 and 10, between 1 and 10,000, and between 0 and 10,000, respectively.

11. The latex product composition according to any of claims 6-10, wherein the anionically-stabilized latex comprises polymer particles dispersed in an aqueous medium with up to 10 wt. % of an anionic surfactant based on the weight of the polymer particles; the polymer particles are selected from the group of an acrylic copolymer, a styrene-acrylic copolymer, a vinyl-acrylic copolymer, a vinyl copolymer, and a combination or mixture thereof.

wherein the addition product is present in an amount between about 0.1 wt. % and 15.0 wt. % and the at least one volatile base compound is present in an amount between about 1.0 wt. % and about 10.0 wt. % based on the weight of the polymer particles present in the anionically-stabilized latex, the at least one volatile base compound is selected from the group of ammonia, trimethylamine, triethylamine, dimethylethanol amine, morpholine, n-methyl morpholine, and a mixture or combination thereof;

12. The latex product composition according to any of claims 6-11, wherein the addition product is selected as (F-1A)

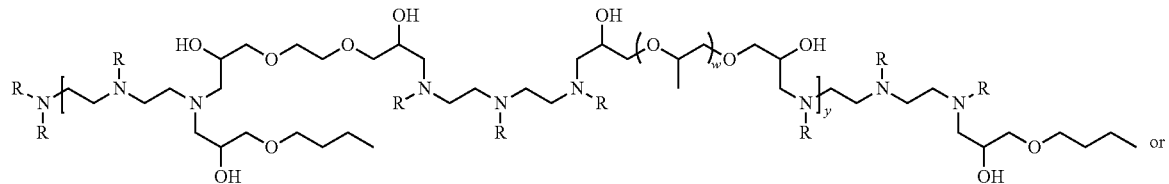 or (F-1B)

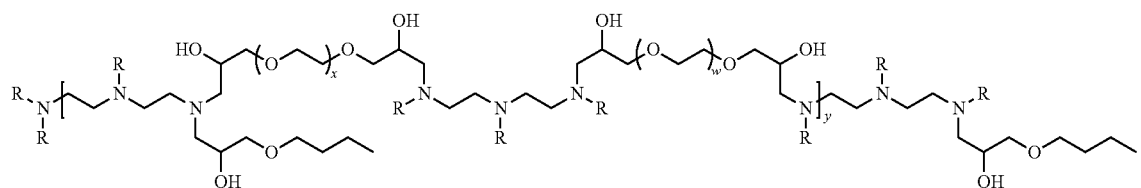

where R is H, alkyl hydroxide, alkyl ether hydroxide, or

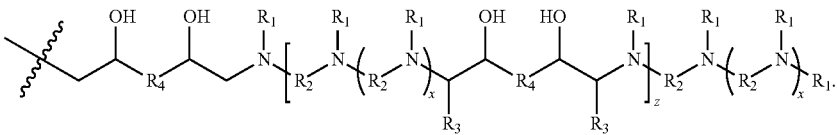

13. A latex product composition comprising:

an anionically-stabilized latex;

at least one volatile base compound; and a polymeric adduct having a backbone comprising a plurality of amine functional groups and hydroxyl functional groups, the polymeric adduct having a number average molecular weight in the range of about 200 to about 1,000,000 Daltons, and comprises a nitrogen atom percentage of 5 to about 35%;

wherein the polymeric adduct is water soluble and formed by reacting an amine compound with one or more epoxy compounds, such that there are 1.3 to 3.8 reactive amine functional groups per reactive epoxy functional groups.

14. The latex product composition according to claim 13, wherein the polymeric adduct has the formula:

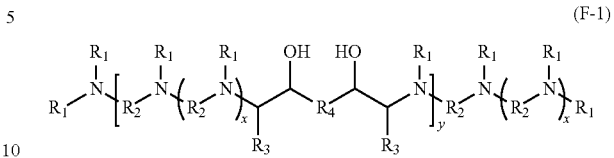
(F-1)

where $R_4$ is alkyl or

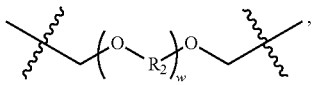

and $R_3$ is hydrogen or alkyl, and $R_2$ is alkyl, and $R_1$ is H, alkyl hydroxide, alkyl ether hydroxide, or

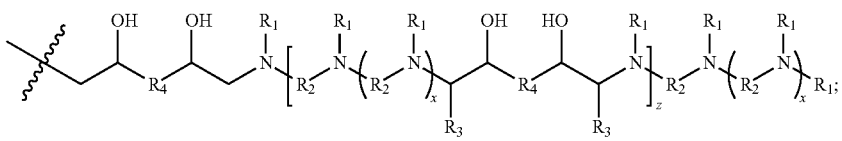

wherein, w, x, y, and z are integers ranging between 1 and 20, between 0 and 10, between 1 and 10,000, and between 0 and 10,000, respectively.

15. The latex product composition according to any of claim 13 or 14, wherein the polymeric adduct is dissolved in water to form an aqueous solution having a viscosity in the range of about 100 centipoise to about 100,000 centipoise and a pH value of about 8 to about 12 when the aqueous solution comprises 70 wt. % of the addition product; the aqueous solution exhibits less than about a 30% viscosity change and maintains a transparent appearance when maintained at a temperature of 50° C. for 30 days.

16. The latex product composition according to any of claims 13-15, wherein the anionically-stabilized latex comprises polymer particles dispersed in an aqueous medium with up to 10 wt. % of an anionic surfactant based on the weight of the polymer particles; the polymer particles are selected from the group of an acrylic copolymer, a styrene-acrylic copolymer, a vinyl-acrylic copolymer, a vinyl copolymer, and a combination or mixture thereof;

wherein the polymeric adduct is present in an amount between about 0.1 wt. % and 15.0 wt. % and the at least one volatile base compound is present in an amount between about 1.0 wt. % and about 10.0 wt. % based on the weight of the polymer particles present in the anionically-stabilized latex, the at least one volatile base compound is selected as one from the group of ammonia, trimethylamine, triethylamine, dimethylethanol amine, morpholine, n-methyl morpholine, and a mixture or combination thereof;

17. The latex product composition according to any of claims 13-16, wherein the polymer adduct is selected as

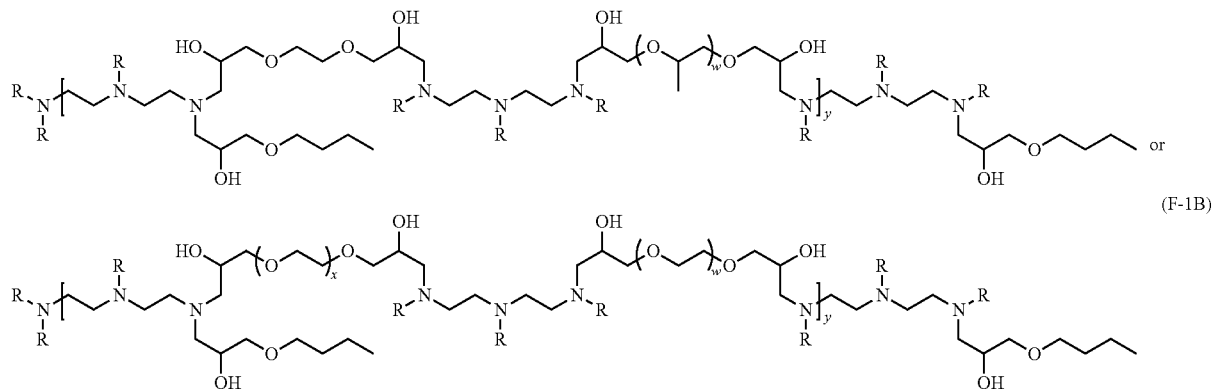

(F-1A)

(F-1B)

where R is H, alkyl hydroxide, alkyl ether hydroxide, or

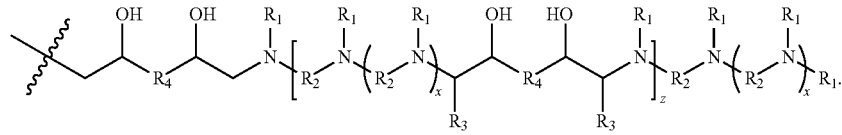

18. The use of the latex product composition according to any of claims 1-17 in a coating, paint, adhesive, sealant, caulk or ink.
19. A coating formulation for use in a traffic paint application, the coating formulation comprising the latex product composition according to any of claim 1, 6, or 13.
20. A coating formulation for use in a decorative or architectural application, the coating formulation comprising the latex product composition according to any of claim 1, 6, or 13.
21. A coating formulation for use as a pressure sensitive adhesive, the coating formulation comprising the latex product composition according to any of claim 1, 6, or 13.
22. A coating formulation for use in a deck application, the coating formulation comprising the latex product composition according to any of claim 1, 6, or 13.
23. A coating formulation for use in a "dry-fall" application, the coating formulation comprising the latex product composition according to any of claim 1, 6, or 13.
24. A coating formulation for use in a cementitious coating application, the coating formulation comprising the latex product composition according to any of claim 1, 6, or 13.
25. The coating formulation according to any of claims 19-24, wherein the coating formulation further comprises one or more additives selected from the group of additional polymers, pigments or colorants, fillers, dispersants or surfactants, coalescent agents, pH neutralizing agents, plasticizers, defoamers, thickeners, biocides, co-solvents, rheology modifiers, wetting or spreading agents, leveling agents, conductive additives, adhesion promoters, anti-blocking agents, anti-cratering agents or anti-crawling agents, anti-freezing agents, corrosion inhibitors, anti-static agents, flame retardants, optical brighteners, UV absorbers or other light stabilizers, chelating agents, crosslinking agents, flattening agents, flocculants, humectants, insecticides, lubricants, odorants, oils, waxes or anti-slip aids, soil repellants, and stain resistant agents.
26. The coating formulation according to any of claims 19-25, wherein upon application to a substrate, the coating formulation becomes tack-free or dry-through in a time that is at least 25% faster than the time required for a similar latex composition that does not include the polymers to be tack-free or dry-through.

The following specific examples are given to illustrate the polymers or polymer adducts and the latex product compositions of the present disclosure, as well as the latex coating formulations formed therefrom and methods of preparing the same, and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

EXAMPLE 1

Preparation of Polymers or Polymeric Adducts

Figure 2:
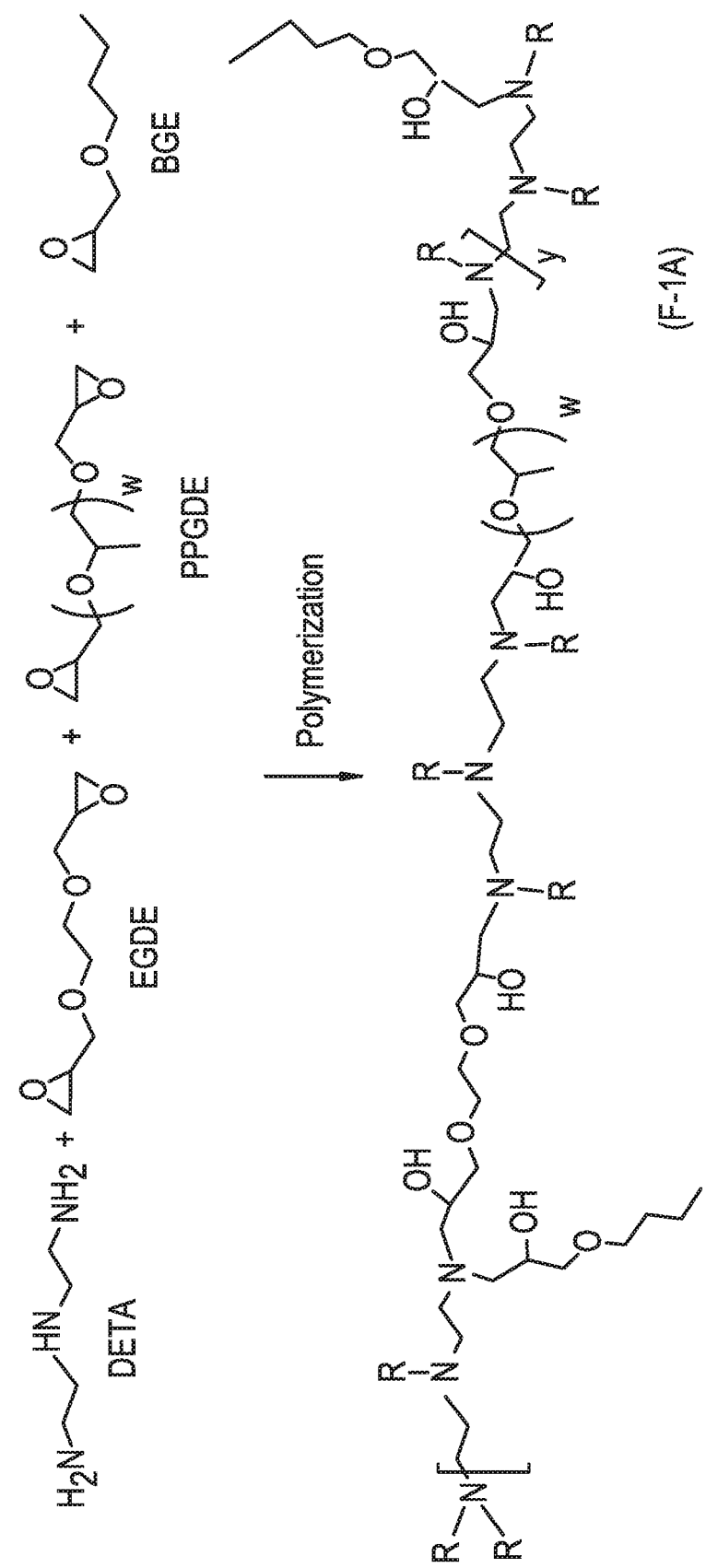
FIG. 2 is a schematic representation of a reaction scheme for forming the polymeric adducts according to the teachings of the present disclosure.
Figure 3:
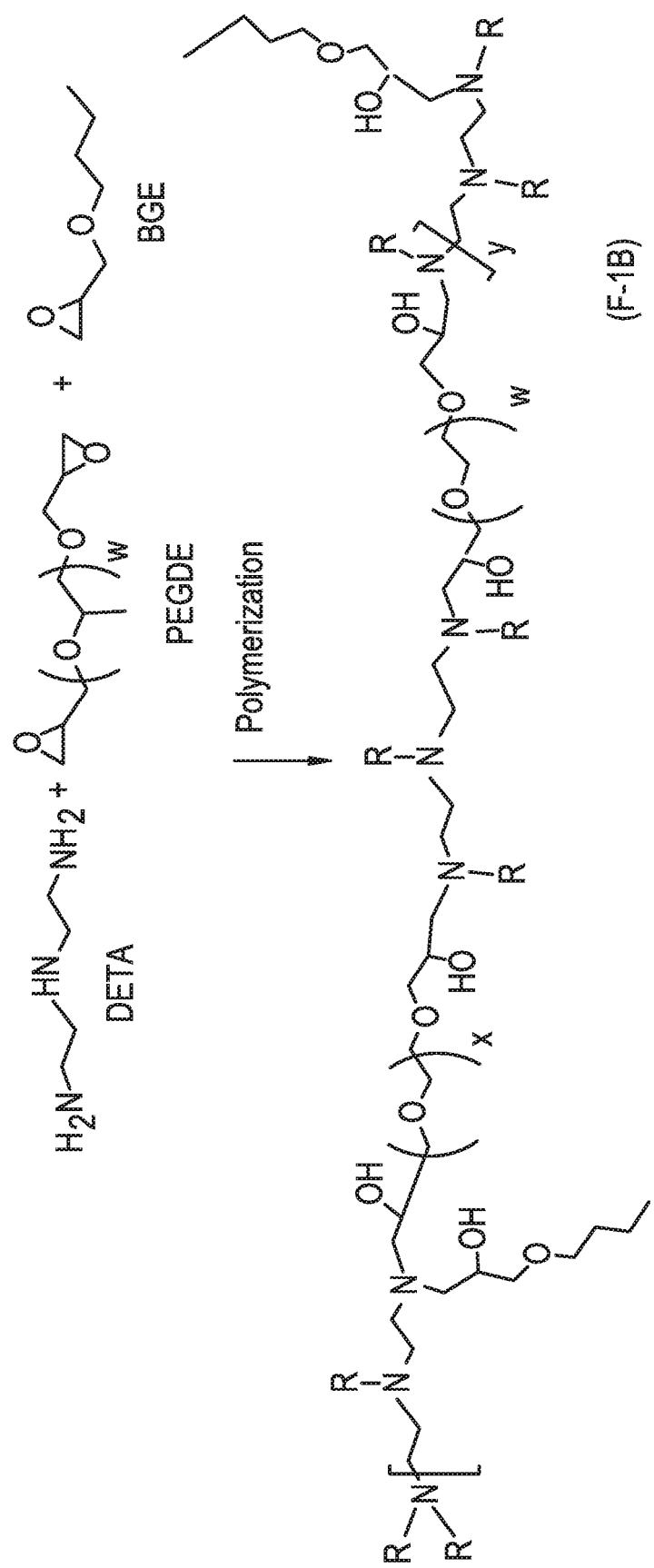
FIG. 3 is a schematic representation of another reaction scheme for forming the polymeric adducts according to the teachings of the present disclosure.

This example demonstrates the formation of polymers or polymeric adducts according to the reaction scheme shown in FIG. 2. In particular, the formation of polymer adducts (PA-5) as described in Table 1 is used an example to demonstrate the formation of the polymers or polymer adducts. A total of 60 parts of diethylene triamine (DETA) is charged into a reaction vessel equipped with a nitrogen blanket. A total of 24 parts of ethylene glycol diglycidyl ether (EGDGE), 72 parts of n-butyl glycidyl ether (BGE), and 14 parts of polypropylene glycol diglycidyl ether (PEGDGE) having a 640 number average molecular weight are mixed in a beaker and transferred into an addition funnel. Under mild stirring, the reaction vessel temperature is raised to 80° C. The contents of the addition funnel are added into the stirred reaction vessel gradually over one hour while maintaining the temperature of the reaction vessel below 110° C. The reaction vessel is held at 80° C. for 2.5 hours after the addition of the mixture of EGDGE, BGE, and PEGDGE is completed. Then 73 parts of deionized water is charged into the reaction vessel and mixed well to form an aqueous solution. The resulting aqueous solution exhibits a pH value of 10.5 and a viscosity of 400 centipoise (at 25° C.), as well as being found to be sufficiently stable.

EXAMPLE 2

Methanol Stability Test

A total of 10 grams of methanol is added into 50 grams of a mixture comprising latex and either a conventional polyamine additive (e.g., polyethyleneimine) or the polymers and/or polymeric adducts (PA-5) prepared in Example 1 above. The conventional polyamine or the polymers and/or polymeric adducts are blended with the latex at 1 weight % based on polymer solids. After quick agitation for about 1 minute, the blended material is poured into a 190 micron filter. After the blended material has passed through the filter, any material that has not passed through the filter is collected and weighed. The unfilterable % is calculated based on 50 grams of blended material. The lower unfilterable % means that the blended material exhibits better methanol stability, e.g., the formation of less unfilterable solids. As shown in Table 2, even at lower pH value, the polymers or polymeric adducts of the present disclosure clearly provides much improved methanol stability as compared to a conventional polyamine additive. Methanol stability is desirable for traffic marking applications in order to achieve the coating stability as methanol is extensively used for the fast setting property.

TABLE 2

Comparison in methanol stability between polyethyleneimine and the polymers or polymeric adducts of the current invention.

| Sample | Amine | pH, before adding polyamine | Unfilterable % |
|---|---|---|---|
| X31215 (Acrylic emulsion) | polymers (PA-5) from Example 1 | 9.6 | 0.9 |
| X31215 (Acrylic emulsion) | polyethyleneimine | 10.0 | 59.0 |
| X31215 (Acrylic emulsion) | polyethyleneimine | 10.2 | 1.3 |
| X41191 (Styrene-acrylic emulsion) | polymers (PA-5) from Example 1 | 9.3 | 1.2 |
| X41191 (Styrene-acrylic emulsion) | polyethyleneimine | 10.2 | 53.4 |

EXAMPLE 3

Comparison of White Traffic Paint Formulations

White paints are prepared according to the formulations shown in Table 3. The latexes employed for this example include an acrylic emulsion (X31215) and a styrene acrylic co-polymer emulsion (X41191). First, Component (A) is prepared under mild agitation of around 400 rpm. In this example, either polymer adducts (PA-5) or polyethyleneimine (PEI) are incorporated into the latex for comparison purposes. Aqueous ammonia is added to achieve the pH value of about 10.0. Then a defoamer, a dispersant, $TiO_2$ pigments, and a thickener (Component (B)) are added into Component (A) under mild agitation. After mixing for 5 to 10 minutes, calcium carbonate and a defoamer (Component (C)) are added under high agitation of about 2000 rpm. After mixing for 5 to 10 minutes, the agitation rate is reduced to about 400 rpm and Component (D) is then added.

The test results as shown in Tables 3-5 and further discussed below for the white paints demonstrate that the polymers or polymeric adducts of the present invention are an effective and useful additive that enhances the dry time and water-resistance of a latex-based paint, while maintaining excellent paint stability during the storage period before application. Dry time is measured at 50-52% relative humidity according to the ASTM Standard test method D 711 (ASTM International, West Conshohocken, Pa.). A steel cylinder weighing 11 lb 14 oz (5385 g) is rolled along a drying traffic paint which has been applied on a glass plate. The paint is considered dry when no paint adheres to the O-rings wrapping around the steel cylinder.

TABLE 3

The formulation employed to prepare a fast-setting paint.

| Component | Ingredient | Paint with polymeric adducts (PA-5) | Paint with PEI |
|---|---|---|---|
| (A) | Water | 21.0 | 21.0 |
| | Latex (NVM-52%) | 454.3 | 454.3 |
| | Amine (PA-5) or PEI | 3.3 (70% active) | 4.7 (50% active) |
| | Aqueous ammonium hydroxide (28%) | 8.0 | 8.0 |
| (B) | Drew-L493 (defoamer) | 2.0 | 2.0 |
| | Rhodline 226/35 (dispersant) | 8.0 | 8.0 |
| | Ti-Pure R-900 ($TiO_2$ pigment) | 100.0 | 100.0 |
| | Natrosol 250 HBR (thickener) | 0.8 | 0.8 |
| (C) | Huber M6 (Calcium carbonate) | 760.0 | 760.0 |
| | Drew-L493 (defoamer) | 2.5 | 2.5 |
| (D) | Propylene glycol | 15 | 15 |
| | Methanol | 30 | 30 |
| | Texanol | 20 | 20 |

Water-resistance is tested as follows. A paint is applied on a glass plate with about 15 mil thickness. After drying for 3 days at ambient condition, the glass plate is immersed in water for 18 hours. After drying for 2 hours at ambient condition, the paint film is examined visually. The paint is considered to fail when the film becomes separated from the glass plate and/or bilsters are formed therein.

As shown in Table 4, the addition of polyethyleneimine to either acrylic or styrene-acrylic latexes as a fast setting additive results in solidification of the paint during exposure to elevated temperatures of 120° F. and 140° F. This clearly demonstrates that the addition of polyethyleneimine as a conventional fast dry (setting) additive to the emulsion product is not a practical means of enhancing the paint dry (setting) time as the paint can become solid and unusable during the storage period prior to use. In contrast, the addition of the polymers or polymeric adducts of the current invention into either acrylic or styrene-acrylic latexes leads to very stable paints even after exposure to 120° F. for 2 weeks and 140° F. for 1 week.

TABLE 4

Comparison in paint stability between polyethyleneimine and the polymers or polymeric adducts of the present disclosure when blended with an emulsion product at 1.0 weight % based on polymer solids.

|  | X31215 (acrylic latex) | X31215 (acrylic latex) w/ polyethyl-eneimine | X41191 (styrene-acrylic latex) w/ polymers or polymeric adducts (PA-5) of Example 1 | X41191 (styrene-acrylic latex) w/ polyethyl-eneimine |
|---|---|---|---|---|
| | w/ polymers or polymeric adducts (PA-5) of Example 1 | | | |
| Before heat exposure | | | | |
| pH Value | 10.1 | 10.2 | 10.1 | 10.2 |
| Viscosity (KU) | 96 | 98 | 94 | 102 |
| After heat exposure at 120° F. for 7 days | | | | |
| pH Value | 10 | Not measurable | 9.9 | Not measurable |
| Viscosity (KU) | 96 | Solidify | 96 | Solidify |
| After heat exposure at 120° F. for 14 days | | | | |
| pH Value | 9.9 | Not measurable | 9.8 | Not measurable |
| Viscosity (KU) | 100 | Solidify | 96 | Solidify |
| After heat exposure at 140° F. for 7 days | | | | |
| pH Value | 10 | Not measurable | 9.9 | Not measurable |
| Viscosity (KU) | 100 | Solidify | 96 | Solidify |

The results shown in Table 5 demonstrate that the polymers or polymeric adducts of the present disclosure provides the latex based paint with faster dry (setting) time and improved water-resistance when blended with the latex as an additive.

TABLE 5

The dry time and water-resistance for polymers or polymeric adducts of the present disclosure when blended with an emulsion product at 1.0 weight % based on polymer solids.

|  | X31215 (acrylic latex) without any polyamine | X31215 (acrylic latex) w/ polymers or polymeric adducts (PA-5) of Example 1 | X41191 (styrene-acrylic latex) without any polyamine | X41191 (styrene-acrylic latex) w/ polymers or polymeric adducts (PA-5) of Example 1 |
|---|---|---|---|---|
| Dry time (seconds)* | 745 | 521 | 807 | 521 |
| Water-resistance | Fail | Pass | Fail | Pass |

*Measured by ASTM Standard D-711

EXAMPLE 4

General Test Methodology for Comparison of Other Latex Coating Formulations

The performance of coating formulations that incorporate the polymers or polymer adducts of the present disclosure into an anionically-stabilized latex can be compared against conventional coating formulations that do not contain an additive that imparts fast-dry performance Additionally, performance can be evaluated comparing the composition of the current disclosure and coatings formulations that contain the same anionically-stabilized latex in the presence of another fast-drying polyamine compound of polyethyleneimine (PEI). Polyethyleneimine (PEI) is added to an anionically-stabilized latex only after the pH of the latex has been increased to 10 or greater by the addition of a volatile base compound (e.g., ammonia, etc.) in order to maintain both immediate and long-term storage of the resulting latex coating formulation.

Stability at low pH—The relative stability of latex coating formulations comprising the polymers or polymer adducts of the present disclosure can be compared against comparable latex coating formulations that contain another type of fast-dry additive. A latex is first adjusted to a predetermined pH value using aqueous ammonia. Subsequently, the polymers or polymeric amine-epoxy adducts of the present disclosure are added to the pH adjusted latex at 2.0 wt. % based on the overall latex solids content to form a latex coating formulation. A separate, comparative latex coating formulation is similarly prepared by adding polyethyleneimine (PEI) to an amount of the pH-adjusted latex at 2.0 wt. %. The resulting latex coating formulations are considered stable when they are sufficiently free of grit and substantially free-flowing. Failure occurs when the latex coating formulations become coagulated and are unable to be agitated. The above procedure is repeated using latex adjusted to a lower predetermined pH value until one determines the lowest pH limit where stability of the resulting latex coating formulation is maintained.

Fast-Setting Performance—Dry times for latex coating formulations can be compared by first adjusting the latex to a pH of 10.5 with aqueous ammonia, then adding either 2 wt. % based on the overall latex solids of either the polymers or polymeric adducts of the present disclosure or another fast-dry additive, PEI. Next, an 8 mil drawdown of the coating composition results in the formation of a film that is subsequently evaluated by touch according to ASTM D-1640 (ASTM International, West Conshocken, Pa.). Tack-free remains as previously defined above to be the time after initial drawdown when the film does not have a tacky feeling when touched with a human finger. Similarly, the definition of dry-through remains as previously defined above to be the time after initial drawdown when the film does not break when gentle pressure and twisting is applied with a human finger.

Water Resistance/Adhesion—The water resistance and ability to maintain adhesion to a substrate for films formed from latex coating formulations comprising the polymers or polymeric adducts of the present disclosure can be compared to both conventional latex coating formulations that do not contain an additive that imparts fast-dry performance. Additionally, the same performance can be evaluated comparing the composition of the current disclosure and coatings formulations that contain another fast-drying additive, PEI, as well as those containing no fast-drying additive ("As-Is"). The films are prepared as previously described above by adjusting an anionically-stabilized latex to a pH of 10.5 with aqueous ammonia followed by the addition of 2.0 wt. % based on the overall solids content of the latex of either the polymers or polymeric adducts of the present disclosure or PEI as the comparative additive. The resulting latex coating formulations are then coated onto a glass substrate using either the 8-mil drawdown technique previously described above. The films are dried at room temperature for 24 hours. The coated substrate is then submerged in water for another 24 hours prior to visual inspection. The films that pass visual inspection maintain adhesion to the glass surface and cannot be easily removed from the glass substrate, while films that fail visual inspection have considerable loss of adhesion to the glass surface.

The use of the polymers or polymer adducts of the present disclosure in a latex coating, paint, adhesive, sealant, caulk, or ink formulation either performs as well as conventional latex formulations or enhances one or more of the stability at low pH at low pH, fast-setting performance, and water resistance/adhesion properties of such latex compositions. Conventional latex formulations include those compositions that do not include any fast-drying additive ("As-Is"), as well as those compositions which include a conventional fast-drying additive, such as polyethyleneimine (PEI).

In the following examples, latex coating formulations that include the polymers or polymer adducts of the present disclosure, which are formed from DETA, EGDGE, BGE, and PPGDGE reactants (see PA-1, Table 1), are compared against both similar latex coating formulations that contain no fast-dry additive and latex coating formulations that comprise polyethyleneimine (PEI) as the fast-drying additive, as well as those containing no fast-drying additive ("As-Is"). The polymers or polymer adducts (PA-1) utilized in the following examples exhibit a viscosity of about 400 centipoise and comprise about 14% nitrogen atom percentage with about 2 amine functional groups per epoxy functional group being employed for the production.

EXAMPLE 5

Comparison of Latex Coatings Used in Architectural or Decorative Applications The stability at low pH, fast-setting performance, and water resistance/adhesion measured according to Example 4 for various acrylic latex coating formulations comprising the polymers or polymeric adducts of the present disclosure are compared in Table 6 against the measured results obtained for similar latex formulations that comprise either PEI or no fast drying additive ("As Is").

TABLE 6

Stability at low pH, Fast Setting Performance, & Water Resistance/Adhesion Results for Architectural or Decorative Latex Coatings

| Latex No. | Low pH Stability | | Fast-setting Performance (minutes to tack free/dry-through) | | | Water Resistance/Adhesion | |
|---|---|---|---|---|---|---|---|
| | PEI | Polymeric Adducts (PA-1) | As Is | PEI | Polymeric Adducts (PA-1) | As Is | Polymeric Adducts (PA-1) |
| L-1 | 10.2 | 9.0 | >20/>20 | 2/4 | 5/6 | Fail | Pass |
| L-2 | 10.2 | 10.0 | >20/>20 | 2/4 | 3/5 | Fail | Pass |
| L-3 | 10.0 | 8.0 | >20/>20 | 2/4 | 3/6 | Fail | Fail |
| L-4 | 9.5 | 9.0 | >20/>20 | 1/4 | 3/4 | Fail | Fail |

Latex L-1 = Encor ® 626 - acrylic emulsion (Arkema Inc.)
Latex L-2 = Encor ® 636 - acrylic emulsion (Arkema Inc.)
Latex L-3 = Encor ® 631 - acrylic emulsion (Arkema Inc.)
Latex L-4 = Encor ® 6413 - vinyl acrylic co-polymer emulsion (Arkema Inc.)

In all cases, the latex coating compositions that contain the polymer adducts of the present disclosure exhibit greater pH stability as compared to latex coating formulations that contain PEI, a polyamine that could be used to impart fast-dry to conventional latex compositions. Thus, for a given latex coating formulation (L-1 to L-4) containing the polymeric adducts of the present disclosure, stability is achievable at a lower pH than for a comparable latex coating formulation containing PEI as the fast drying additive. Thus, when the polymers or polymeric adducts of the present disclosure are incorporated into the latex coating formulation, a smaller amount of a volatile base (e.g., ammonia, trimethylamine, triethylamine, etc.) needs to be added to the coating formulation in order to achieve long-term stability.

Latex coating formulations (L-1 to L-4) that contain the polymeric adducts of the present disclosure are found to be tack-free and dry-through in less time than a similar latex coating formulation that does not contain any fast drying additive ("As Is"). In addition, latex coating formulations that contain the polymeric adducts of the present disclosure exhibit similar tack-free and dry-through properties as latex coating formulations that include PEI as the fast drying additive.

When a latex coating formulation (L-1 to L-4) that includes the polymeric adducts of the present disclosure is cast into a film on a glass plate, the resulting film exhibits greater adhesion to the glass substrate when exposed to water, as compared to the comparable latex coating formulations that are absent the polymeric adducts ("As Is"). This example clearly demonstrates that the novel compositions of the present disclosure provide useful architectural and decorative coatings with fast setting and/or water resistance property at low pH values of about below 9.0.

EXAMPLE 6

Comparison of Latex Compositions Used as Pressure-Sensitive Adhesives

The stability at low pH, fast-setting performance, and water resistance/adhesion measured according to Example 4 for various acrylic latex pressure-sensitive adhesive (PSA) compositions that include the polymers or polymeric adducts of the present disclosure are compared in Table 7 against the measured results obtained for similar latex PSA formulations that comprise either PEI or no fast drying additive ("As Is"). The only change in the test methodology of Example 4 that is utilized in the comparison of the PSA compositions within this example is the addition of a total of 1.6 wt. % of the polymeric adducts or PEI to the latex instead of 2.0 wt. % as described in Example 4.

TABLE 7

Stability at low pH, Fast-Setting Performance, & Water Resistance/Adhesion Results for Pressure-Sensitive Adhesives (PSA).

| Latex No. | Low pH Stability | | Fast-setting Performance (minutes to tack free) | | | Water Resistance/Adhesion | | |
|---|---|---|---|---|---|---|---|---|
| | PEI | Polymeric Adducts (PA-1) | As Is | PEI | Polymeric Adducts (PA-1) | As Is | PEI | Polymeric Adducts (PA-1) |
| L-5 | 10.0 | 9.0 | >30 | 20 | >30 | Pass | Pass | Pass |
| L-6 | 8.0 | 6.0 | >30 | 3 | >30 | Fail | Pass | Pass |
| L-7 | 5.0* | 8.5 | >30 | >30 | >30 | Pass | Pass | Pass |

*= no aqueous ammonia was added
Latex L-5 = Encor® 9043 - acrylic emulsion (Arkema Inc.)
Latex L-6 = Encor® 9466 - acrylic co-polymer emulsion (Arkema Inc.)
Latex L-7 = Encor® 9285 - styrene acrylic co-polymer emulsion (Arkema Inc.)

Generally, latex PSA compositions that contain the polymer adducts of the present disclosure exhibit greater pH stability as compared to latex PSA compositions that contain PEI, a polyamine that can be used to impart fast-dry to conventional latex compositions. Thus, for a given latex PSA composition (L-5 or L-6) containing the polymeric adducts of the present disclosure, stability is achievable at a lower pH than for a comparable latex PSA composition containing PEI as the fast drying additive. Thus, when the polymers or polymeric adducts of the present disclosure are incorporated into the latex PSA composition, a smaller amount of a volatile base compound (e.g., ammonia, trimethylamine, triethylamine, etc.) needs to be added to the PSA composition in order to achieve long-term stability.

Latex PSA compositions (L-5 to L-7) that contain the polymeric adducts of the present disclosure are found to be tack-free in about the same time as a similar latex PSA composition that does not contain any fast drying additive ("As Is"). In addition, latex PSA compositions that contain the polymeric adducts of the present disclosure exhibit at least similar if not longer tack free properties as latex PSA compositions that include PEI as the fast drying additive.

When a latex PSA composition (L-5 to L-7) that includes the polymeric adducts of the present disclosure is cast into a film on a glass plate, the resulting film exhibits at least the same if not greater adhesion to the glass substrate when exposed to water, as compared to the comparable latex coating compositions that are absent the polymeric adducts ("As Is") or utilize PEI as the fast drying additive. The latex compositions targeted for the pressure sensitive adhesives typically have far lower glass transition temperatures than the ambient temperature as a long tack time is desired. This example clearly demonstrates that the novel compositions of the present disclosure provide useful pressure sensitive adhesives with improved water resistance and workable tack time.

EXAMPLE 7

Comparison of Latex Coatings Applied to Decks or Used in a "Dry-Fall" Application The stability at low pH, fast-setting performance, and water resistance/adhesion measured according to Example 4 for various acrylic latex coating formulations comprising the polymers or polymeric adducts of the present disclosure are compared in Table 8 against the measured results obtained for similar latex formulations that comprise either PEI or no fast-drying additive ("As Is"). Dry-Fall coatings represent latex coating formulations in which the occurrence of any overspray during application of the coating dries to a non-adhering dust over a predetermined distance (e.g., fall) under conditions of moderate humidity (about 50% relative humidity) and temperature (about 25° C.).

The polymer or polymeric adducts utilized in this example include PA-1 as previously described, as well as PA-2, which is formed using DETA and EGDGE as reactants. The PA-2 polymers or polymer adducts are formulated to exhibit a higher viscosity, a higher nitrogen atom percentage, and a higher amine to epoxy functional group ratio than the PA-1 polymers or polymer adducts. The PA-2 polymers or polymer adducts used in this example exhibit a viscosity of about 2,000 centipoise; a nitrogen atom percentage of about 22%; and about 3.2 amine functional groups per epoxy functional group.

The latex coating formulation that contains the polymer adducts of the present disclosure exhibits greater pH stability as compared to the latex coating composition that contains PEI. Thus, for the latex coating formulation (L-8) that contains the polymeric adducts of the present disclosure, stability is achievable at a lower pH than for a comparable latex coating formulation containing PEI as the fast drying additive. Thus, when the polymers or polymeric adducts of the present disclosure are incorporated into the latex coating formulation, a smaller amount of a volatile base compound (e.g., ammonia, trimethylamine, triethylamine, etc.) needs to be added to the coating composition in order to achieve long-term stability.

TABLE 8

Stability at low pH, Fast-Setting Performance, & Water Resistance/Adhesion Results for Deck or Dry-Fall Latex Coatings.

| Latex No. | Low pH Stability | | Fast-setting Performance (minutes to tack free/dry-through) | | | | Water Resistance/Adhesion | | |
|---|---|---|---|---|---|---|---|---|---|
| | PEI | Polymeric Adducts (PA-1) | As Is | PEI | Polymeric Adducts (PA-1) | Polymeric Adducts (PA-2) | As Is | PEI | Polymeric Adducts (PA-1) | Polymeric Adducts (PA-2) |
| L-8 | 10.2 | 9 | >20/>>20 | 4/6 | 17/20 | 5/8 | Fail | Pass | Pass | Pass |

Latex L-8 = X31215 - acrylic emulsion (Arkema Inc.)

The latex coating formulation (L-8) that contains the polymeric adducts (PA-1, PA-2) of the present disclosure is found to be tack-free and dry-through in less time than a similar latex coating formulation that does not contain any fast drying additive ("As Is"). In addition, the latex coating formulation (L-8) that contains the polymeric adducts (PA-1) exhibit similar tack-free and dry-through properties as the latex coating formulation that include PEI as the fast drying additive.

When the latex coating formulation (L-8) that includes the polymeric adducts (PA-1, PA-2) of the present disclosure is cast into a film on a glass plate, the resulting film exhibits greater adhesion to the glass substrate when exposed to water, as compared to the comparable latex coating formulations that are absent the polymeric adducts ("As Is") and similar adhesion as exhibited by a latex composition comprising PEI as a fast drying additive.

EXAMPLE 8

Comparison of Latex Coatings for Use with Cementitious Substrates

The stability at low pH and fast-setting performance measured according to Example 4 for an acrylic latex coating formulations comprising the polymers or polymeric adducts of the present disclosure are compared in Table 9 against the measured results obtained for similar latex formulations that comprise either PEI or no fast drying additive ("As Is").

The latex coating formulation that contains the polymer adducts of the present disclosure exhibits greater pH stability as compared to the latex coating composition that contains PEI. Thus, for the latex coating formulation L-1 that contains the polymeric adducts of the present disclosure, stability is achievable at a lower pH than for a comparable latex coating formulation containing PEI as the fast drying additive. Thus, when the polymers or polymeric adducts of the present disclosure are incorporated into the latex coating formulation, a smaller amount of a volatile base compound (e.g., ammonia, trimethylamine, triethylamine, etc.) needs to be added to the coating composition in order to achieve long-term stability The latex coating formulation L-1 that contains the polymeric adduct PA-1 of the present disclosure is found to be tack-free and dry-through in less time than a similar latex coating formulation that does not contain any fast drying additive ("As Is"). In addition, the latex coating formulation L-1 that contains the polymeric adducts (PA-1) exhibit similar tack-free and dry-through properties as the latex coating formulation that include PEI as the fast drying additive.

TABLE 9

Stability at low pH and Fast-Setting Performance Results for Cementitious Latex Coatings

| Latex No. | Low pH Stability | | Fast-setting Performance (minutes to tack-free/dry-through) | |
|---|---|---|---|---|
| | PEI | Polymeric Adducts (PA-1) | As Is | PEI | Polymeric Adducts (PA-1) |
| L-1 | 10.2 | 9.0 | >20/>20 | 2/4 | 5/6 |

Latex L-1 = Encor ® 626-acrylic emulsion (Arkema Inc.)

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

The invention claimed is:
1. A latex product composition comprising:
an anionically-stabilized latex;
at least one volatile base compound; and
an addition product of at least one multifunctional amine compound reacted with one or more polyfunctional epoxy compounds, one or more monofunctional epoxy compounds, or a combination thereof;
wherein the amine compound and the one or more epoxy compounds provide 1.3 to 3.8 amine functional group per epoxy functional group;
wherein the addition product is water soluble, has a number average molecular weight in the range of about 200 to about 1,000,000 Daltons, and comprises a nitrogen atom percentage of 5 to about 35%.

2. The latex product composition according to claim 1, wherein the polyfunctional epoxy compounds comprise epoxides of unsaturated hydrocarbons and fatty acids/oils, epoxy ethers of multifunctional alcohols, or combinations thereof and the monofunctional epoxy compounds comprise epoxy ethers of monofunctional alcohols, epoxy esters of monofunctional alcohols, or combinations thereof;

wherein the multifunctional amine compounds are selected from the group of ethylene diamine, butylene diamine, diethylene triamine, hexamethylene triamine, triethylene tetramine, polyoxyethylene amines, 2-methyl pentamethylene diamine, 1,3-diamino propane, 1,4-diamino butane, 1,5-diamino pentane, 1,6-diamino hexane, 1,2-diamino cyclohexane, isophorone diamine, tetraethylene pentamine, 4,4'-methylene-bis-cyclohexyl amine, bis(3-methyl-4aminocyclihexyl) methane, 2,2-bis(3-methyl-4-aminocyclohexyl) propane, 2,6-bis(aminomethyl) norborane, cyclohexane diamine, 3,4-diamino furan, phenylene diamine, 2,4-diamino toluene, polyalkylene oxide diamine, polyalkylene oxide triamine, 2,6 diamino toluene and the combinations thereof.

3. The latex product composition according to claim 1, wherein the at least one multifunctional amine compound is diethylene triamine (DETA) and the one or more polyfunctional epoxy compounds and/or monofunctional epoxy compounds are selected from the group of ethylene glycol diglycidyl ether (EGDGE), n-butyl glycidyl ether (BGE), polypropylene glycol diglycidyl ether (PPGDGE), and polyethylene glycol diglycidyl ether (PEGDGE).

4. The latex product composition according to claim 1, wherein the addition product is dissolved in water to form an aqueous solution having a viscosity in the range of about 100 centipoise to about 100,000 centipoise and a pH value of about 8 to about 12 when the aqueous solution comprises 70 wt. % of the addition product; the aqueous solution exhibits less than about a 30% viscosity change and maintains a transparent appearance when maintained at a temperature of 50° C. for 30 days.

5. The latex product composition according to claim 1, wherein the addition product has the formula (F-1):

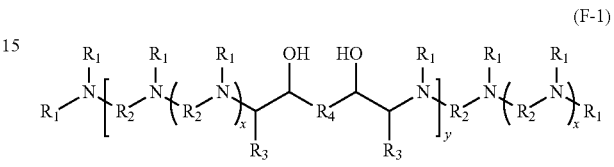

(F-1)

where $R_4$ is alkyl or

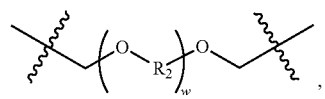

, and $R_3$ is hydrogen or alkyl, and $R_2$ is alkyl, and $R_1$ is H, alkyl hydroxide, alkyl ether hydroxide, or

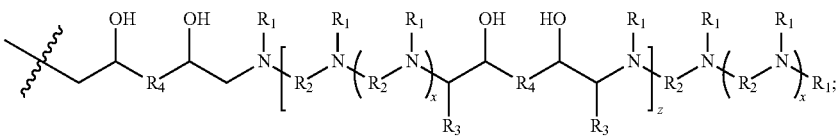

;

wherein, w, x, y, and z are integers ranging between 1 and 20, between 0 and 10, between 1 and 10,000, and between 0 and 10,000, respectively.

6. The latex product composition according to claim 1, wherein the anionically-stabilized latex comprises polymer particles dispersed in an aqueous medium with up to 10 wt. % of an anionic surfactant based on the weight of the polymer particles;

wherein the polymer particles are selected from the group of an acrylic copolymer, a styrene-acrylic copolymer, a vinyl-acrylic copolymer, a vinyl copolymer, and a combination or mixture thereof.

7. The latex product composition according to claim 6, wherein the addition product is present in an amount between about 0.1 wt. % and 15.0 wt. % and the at least one volatile base compound is present in an amount between about 1.0 wt. % and about 10.0 wt. % based on the weight of latex particles present in the anionically-stabilized latex.

8. The latex product composition according to claim 1, wherein the at least one volatile base compound is selected from the group of ammonia, trimethylamine, triethylamine, dimethylethanol amine, morpholine, n-methyl morpholine, and a mixture or combination thereof.

9. The latex product composition according to claim 5, wherein the addition product is selected as

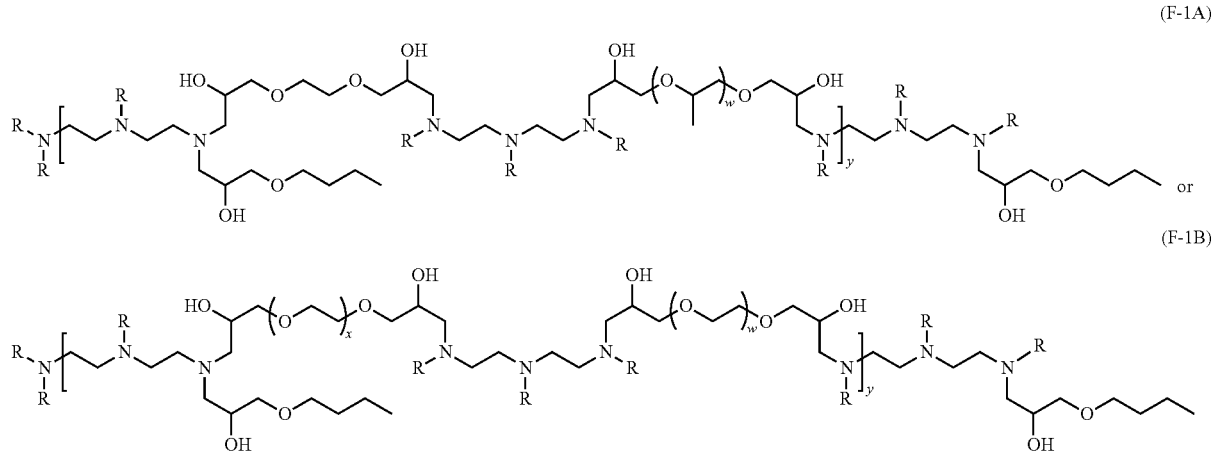

where R is H, alkyl hydroxide, alkyl ether hydroxide, or

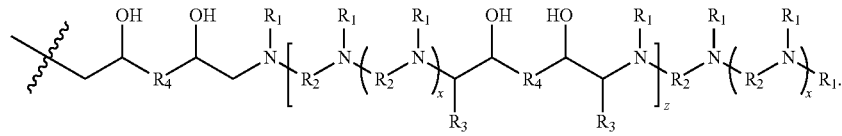

10. A latex product composition comprising:

an anionically-stabilized latex;

at least one volatile base compound; and a polymeric adduct having a backbone comprising a plurality of amine functional groups and hydroxyl functional groups, the polymeric adduct having a number average molecular weight in the range of about 200 to about 1,000,000 Daltons, and comprises a nitrogen atom percentage of 5 to about 35%;

wherein the polymeric adduct is water soluble and formed by reacting one or more amine compound with one or more epoxy compounds, such that there are 1.3 to 3.8 reactive amine functional groups per reactive epoxy functional groups.

11. The latex product composition according to claim 10, wherein the polymeric adduct has the formula (F-1):

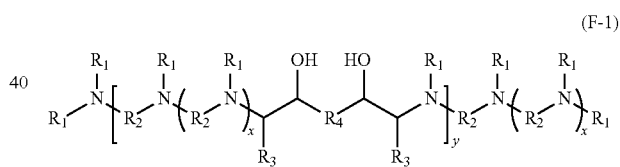

where $R_4$ is alkyl or

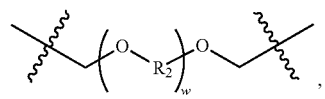

and $R_3$ is hydrogen or alkyl, and $R_2$ is alkyl, and $R_1$ is H, alkyl hydroxide, alkyl ether hydroxide, or

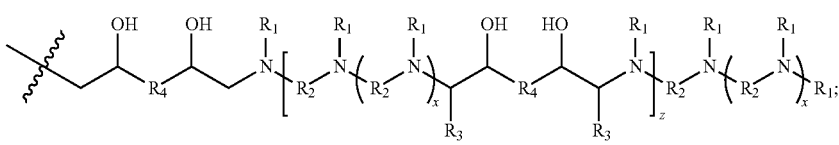

wherein, w, x, y, and z are integers ranging between 1 and 20, between 0 and 10, between 1 and 10,000, and between 0 and 10,000, respectively.

12. The latex product composition according to claim 10, wherein the polymeric adduct is dissolved in water to form an aqueous solution having a viscosity in the range of about 100 centipoise to about 100,000 centipoise and a pH value of about 8 to about 12 when the aqueous solution comprises 70 wt. % of the addition product; the aqueous solution exhibits less than about a 30% viscosity change and maintains a transparent appearance when maintained at a temperature of 50° C. for 30 days.

13. The latex product composition according to claim 10, wherein the polymeric adduct is present in an amount between about 0.1 wt. % and 15.0 wt. % and the at least one volatile base compound is present in an amount between about 1.0 wt. % and about 10.0 wt. % based on the weight of latex particles present in the anionically-stabilized latex.

14. The latex product composition according to claim 10, wherein the anionically-stabilized latex comprises polymer particles dispersed in an aqueous medium with up to 10 wt. % of an anionic surfactant based on the weight of the polymer particles;
wherein the polymer particles are selected from the group of an acrylic copolymer, a styrene-acrylic copolymer, a vinyl-acrylic copolymer, a vinyl copolymer, and a combination or mixture thereof.

15. The latex product composition according to claim 10, wherein the at least one volatile base compound is selected as one from the group of ammonia, trimethylamine, triethylamine, dimethylethanol amine, morpholine, n-methyl morpholine, and a mixture or combination thereof.

16. The latex product composition according to claim 11, wherein the polymeric adduct is selected as

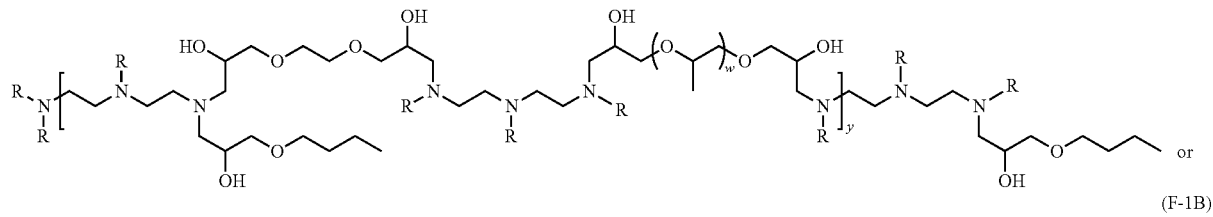
(F-1A)

or

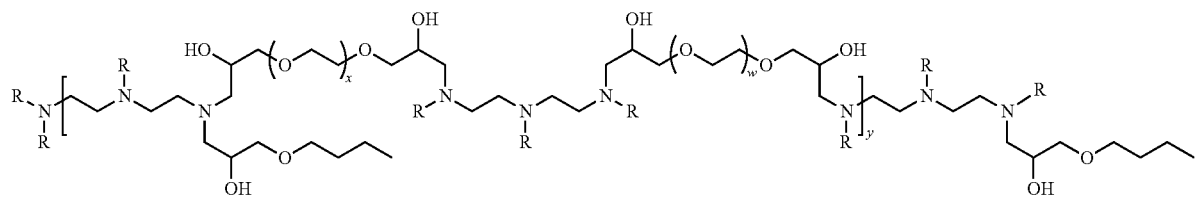
(F-1B)

where R is H, alkyl hydroxide, alkyl ether hydroxide, or

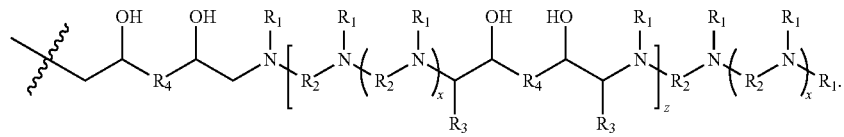

* * * * *